US009886253B2

(12) United States Patent
Garimella et al.

(10) Patent No.: US 9,886,253 B2
(45) Date of Patent: Feb. 6, 2018

(54) TECHNIQUES FOR MANAGING FUNCTIONAL SERVICE DEFINITIONS IN AN SOA DEVELOPMENT LIFECYCLE

(75) Inventors: Annaji Garimella, Cupertino, CA (US); Ravindran Sankaran, Union City, CA (US); Nan Xie, San Ramon, CA (US); Thirupathi Reddy Annadi, Sunnyvale, CA (US); Mark James Glenn Craig, Redwood City, CA (US); Arvind Srinivasamoorthy, Hyderabad (IN); Purushotham Kola, Secunderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 509 days.

(21) Appl. No.: 12/768,990

(22) Filed: Apr. 28, 2010

(65) Prior Publication Data

US 2011/0161913 A1 Jun. 30, 2011

Related U.S. Application Data

(60) Provisional application No. 61/290,850, filed on Dec. 29, 2009.

(51) Int. Cl.
*G06F 9/44* (2006.01)
*G06F 9/445* (2006.01)

(52) U.S. Cl.
CPC .................. *G06F 8/60* (2013.01); *G06F 8/10* (2013.01); *G06F 8/36* (2013.01)

(58) Field of Classification Search
CPC ..................................... G06F 8/10; G06F 8/60
USPC .......................................................... 717/101
See application file for complete search history.

(56) References Cited

U.S. PATENT DOCUMENTS

| | | | |
|---|---|---|---|
| 5,699,518 | A | 12/1997 | Held et al. |
| 5,850,518 | A | 12/1998 | Northrup |
| 6,397,254 | B1 | 5/2002 | Northrup |
| 6,421,705 | B1 | 7/2002 | Northrup |
| 6,546,413 | B1 | 4/2003 | Northrup |
| 6,671,713 | B2 | 12/2003 | Northrup |
| 6,671,746 | B1 | 12/2003 | Northrup |
| 6,779,000 | B1 | 8/2004 | Northrup |

(Continued)

OTHER PUBLICATIONS

U.S. Appl. No. 12/768,999, filed Apr. 28, 2010, Garimella et al.

(Continued)

*Primary Examiner* — Li B Zhen
*Assistant Examiner* — Bradford Wheaton
(74) *Attorney, Agent, or Firm* — Kilpatrick Townsend & Stockton LLP

(57) ABSTRACT

A framework (referred to herein as Application Integration Architecture, or AIA) that formalizes and orchestrates activities in an SOA development lifecycle. In one set of embodiments, AIA can capture development-related information in a shared data store and cause the information to flow in an automated or semi-automated manner from one lifecycle phase to the next as the lifecycle progresses. This information flow can, in turn, facilitate automations at each lifecycle phase for the responsible stakeholders (e.g., solution architects, developers, installation developers, etc.), thereby enforcing SOA best practices, enhancing development productivity, and ensuring the quality of the final SOA deliverables.

22 Claims, 34 Drawing Sheets

(56) References Cited

U.S. PATENT DOCUMENTS 6,865,737 B1* 3/2005 Lucas et al. .................. 717/178
6,922,705 B1 7/2005 Northrup
7,062,749 B2 6/2006 Cyr et al.
7,340,520 B1 3/2008 Jordan
7,430,590 B1 9/2008 Rive et al.
7,512,942 B2 3/2009 Brown et al.
7,526,764 B2 4/2009 Fanshier
7,535,927 B1 5/2009 Northrup
7,603,674 B2 10/2009 Cyr et al.
7,607,126 B2 10/2009 Read
7,676,806 B2 3/2010 Curtis et al.
7,761,844 B2 7/2010 Bove et al.
7,774,404 B2 8/2010 Heidasch
7,840,669 B2* 11/2010 Dutta et al. ................... 709/224
7,870,550 B1 1/2011 Qureshi et al.
7,873,960 B2 1/2011 Templin et al.
8,015,541 B1 9/2011 Srinivasan et al.
8,140,582 B2 3/2012 Chen et al.
8,234,561 B1 7/2012 Bourdev
8,239,819 B2 8/2012 Hafermann et al.
8,527,985 B2 9/2013 Srinivasamoorthy et al.
8,584,119 B2 11/2013 Ellington et al.
8,627,309 B2 1/2014 Scheidel et al.
8,645,837 B2* 2/2014 Little ............................ 715/735
8,677,309 B2 3/2014 Xie et al.
8,806,475 B2 8/2014 Xie
9,395,965 B2 7/2016 Garimella et al.
2002/0184610 A1 12/2002 Chong et al.
2003/0172127 A1 9/2003 Northrup
2004/0148370 A1 7/2004 Sadiq
2005/0080801 A1 4/2005 Kothandaraman
2005/0086197 A1 4/2005 Boubez et al.
2005/0204356 A1 9/2005 Sundararajan et al.
2005/0262191 A1* 11/2005 Mamou et al. ............... 709/203
2005/0289536 A1 12/2005 Nayak et al.
2006/0029054 A1 2/2006 Breh et al.
2006/0031831 A1 2/2006 Templin et al.
2006/0041643 A1 2/2006 Fanshier
2006/0050862 A1* 3/2006 Shen et al. .................... 379/219
2006/0095274 A1 5/2006 Phillips et al.
2006/0150156 A1 7/2006 Cyr et al.
2006/0253848 A1 11/2006 Mathieu et al.
2006/0265508 A1 11/2006 Angel et al.
2007/0028208 A1 1/2007 Maki
2007/0055972 A1 3/2007 Brown et al.
2007/0074203 A1 3/2007 Curtis et al.
2008/0005086 A1* 1/2008 Moore .............. G06F 17/30876
2008/0065466 A1 3/2008 Liu et al.
2008/0127047 A1 5/2008 Zhang et al.
2008/0250386 A1 10/2008 Erl
2008/0256507 A1 10/2008 Chaar et al.
2008/0282219 A1 11/2008 Seetharaman et al.
2009/0006147 A1 1/2009 Padmanabhan
2009/0007088 A1* 1/2009 Fischer ..................... G06F 8/36 717/165
2009/0022151 A1* 1/2009 Jeon et al. .................... 370/389
2009/0094577 A1 4/2009 Fachat
2009/0144729 A1* 6/2009 Guizar ...................... G06F 8/60 717/176
2009/0276769 A1 11/2009 Brannen et al.
2009/0281996 A1 11/2009 Liu et al.
2009/0285376 A1 11/2009 Kremer-Davidson et al.
2009/0300192 A1 12/2009 Northrup
2010/0017387 A1 1/2010 Roshen
2010/0042986 A1* 2/2010 Greiner et al. ............... 717/174
2010/0095266 A1 4/2010 Novak
2010/0125618 A1 5/2010 Dutta et al.
2010/0217636 A1 8/2010 Channabasavaiah et al.
2010/0228587 A1* 9/2010 Channabasavaiah et al. .... 705/8
2010/0306772 A1 12/2010 Arnold
2010/0312590 A1* 12/2010 Arunachalam et al. .......... 705/7
2010/0318974 A1 12/2010 Hrastnik et al.
2011/0041141 A1* 2/2011 Harm et al. .................. 719/318
2011/0078654 A1 3/2011 Thies et al.
2011/0161914 A1 6/2011 Xie et al.
2011/0161915 A1 6/2011 Srinivasamoorthy et al.
2011/0161921 A1 6/2011 Garimella et al.
2011/0276961 A1* 11/2011 Johansson et al. ........... 717/178
2012/0066674 A1 3/2012 Xie
2012/0167072 A1 6/2012 Boykin et al.
2014/0040882 A1 2/2014 Srinivasamoorthy et al.

OTHER PUBLICATIONS

U.S. Appl. No. 12/769,006, filed Apr. 28, 2010, Xie et al.

U.S. Appl. No. 12/769,016, filed Apr. 28, 2010, Srinivasamoorthy et al.

Adcock et al., "ANSAware and DCE-A Comparison" May 1994, 1-64 pages.

Li, "An overview of real time ANSAware 1.0," Distribution System Engineering 2, Copyright 1995, pp. 28-38,The British Computer Society, UK.

Final Office Action for U.S. Appl. No. 12/769,006 dated May 8, 2013, 17 pages.

Notice of Allowance for U.S. Appl. No. 12/769,016 dated May 8, 2013, 9 pages.

Non-Final Office Action for U.S. Appl. No. 12/881,028 dated May 21, 2013, 9 pages.

Advisory Action for U.S. Appl. No. 12/769,006 dated Jul. 1, 2013, 3 pages.

Non-Final Office Action for U.S. Appl. No. 12/881,028 dated Oct. 1, 2012, 9 pages.

Non-Final Office Action for U.S. Appl. No. 12/769,016 dated Nov. 23, 2012, 11 pages.

Non-Final Office Action for U.S. Appl. No. 12/769,006 dated Dec. 7, 2012, 13 pages.

Non-Final Office Action for U.S. Appl. No. 12/768,999 dated Mar. 15, 2013, 13 pages.

Final Office Action for U.S. Appl. No. 12/768,999 dated May 12, 2015, 17 pages.

Cox et al., "Management of the Service-Oriented-Architecture Life Cycle", IBM Systems Journal, col. 44, No. 4, 2005 18 pages.

Laliwala et al., "Event-Driven Service-Oriented Architecture", IEEE, 2008, 6 pages.

Non-Final Office Action for U.S. Appl. No. 12/768,999 dated Dec. 11, 2013, 14 pages.

Final Office Action for U.S. Appl. No. 12/881,028 dated Jan. 14, 2014, 12 pages.

Notice of Allowance for U.S. Appl. No. 12/769,006 dated Jan. 16, 2014, 8 pages.

Non-Final Office Action for U.S. Appl. No. 13/970,516 dated Dec. 3, 2014, 18 pages.

Non-Final Office Action for U.S. Appl. No. 12/768,999 dated Nov. 14, 2014, 15 pages.

Schmidt "Model-Driven Engineering", IEEE Computer,vol. 39, No. 2 Retrieved from the Internet: URL<http://dl.acm.org/citation.cfm?id=1115706>, Feb. 2006, pp. 25-31.

Notice of Allowance for U.S. Appl. No. 12/881,028 dated Apr. 25, 2014, 8 pages.

Final Office Action for U.S. Appl. No. 12/768,999 dated Jul. 24, 2014, 16 pages.

Non-Final Office Action for U.S. Appl. No. 12/768,999 dated Aug. 28, 2015, 17 pages.

Final Office Action for U.S. Appl. No. 13/970,516 dated Jun. 17, 2015, 23 pages.

U.S. Appl. No. 13/970,516, Non-Final Office Action dated Feb. 26, 2016, 18 pages.

U.S. Appl. No. 12/768,999, Notice of Allowance dated Mar. 23, 2016, 11 pages.

U.S. Appl. No. 12/768,999, Corrected Notice of Allowability dated Jun. 6, 2016, 2 pages.

U.S. Appl. No. 13/970,516, Final Office Action dated Jul. 22, 2016, 20 pages.

U.S. Appl. No. 13/970,516, filed Aug. 19, 2013 by Srinivasamoorthy et al.

Non-Final Office Action for U.S. Appl. No. 12/769,006 dated Aug. 1, 2013, 20 pages.

(56) References Cited

OTHER PUBLICATIONS

Final Office Action for U.S. Appl. No. 12/768,999 dated Aug. 9, 2013, 13 pages.
Final Office Action for U.S. Appl. No. 12/769,006 dated Oct. 10, 2013, 20 pages.
U.S. Appl. No. 13/970,516 , "Notice of Allowance", dated Feb. 10, 2017, 8 pages.

* cited by examiner

600

700

800

1000

1200

1500

1600

1800

2200

2600

2800

```
<?xml version="1.0" encoding="UTF-8" ?>
- <properties>
  - <aiainstance>
    - <oer>
    - <fp>
        <version>3.0.0.0.0</version>
      - <server>
          <adminhostname>sdc68021crm.us.oracle.com</adminhostname>
          <adminport>7071</adminport>
          <domainname>soa_domain</domainname>
          <username>weblogic</username>
          <password>{C@568c24</password>
          <servertype>Server</servertype>
          <soaserver>soa_server1</soaserver>
          <!-- In case of cluster the below would be the Proxy URL and proxy Port -->
          <soaserverhostname>sdc68021crm.us.oracle.com</soaserverhostname>
          <soaserverport>8071</soaserverport>
        </server>
      - <db>
        - <aia>
            <jdbc-url>jdbc:oracle:thin:@sdc68021crm.us.oracle.com:1591:ovm21crm</jdbc-url>
            <username>AIA1023_AIA</username>
            <password>{C@957096</password>
            <createschema>true</createschema>
            <sysusername>sys</sysusername>
            <syspassword>{C@112905b</syspassword>
            <role>SYSDBA</role>
            <defaulttablespace>SYSTEM</defaulttablespace>
            <temptablespace>TEMP</temptablespace>
          </aia>
        + <mds>
        + <src>
        + <jms>
        + <xref>
        + <aialifecycle>
        </db>
    </fp>
```

3300

*FIG. 33*

TECHNIQUES FOR MANAGING FUNCTIONAL SERVICE DEFINITIONS IN AN SOA DEVELOPMENT LIFECYCLE

CROSS-REFERENCES TO RELATED APPLICATIONS

The present application claims the benefit and priority under 35 U.S.C. 119(e) of U.S. Provisional Application No. 61/290,850, filed Dec. 29, 2009, entitled "SUPPORT FOR END-TO-END SOA PROJECT DEVELOPMENT LIFE-CYCLE," the entire contents of which are incorporated herein by reference for all purposes.

The present application also incorporates by reference for all purposes the entire contents of the following commonly-assigned applications, which are filed concurrently with the present application:

U.S. Non-Provisional application Ser. No. 12/768,999, filed Apr. 23, 2010, entitled "TECHNIQUES FOR AUTOMATED GENERATION OF SERVICE ARTIFACTS";

U.S. Non-Provisional application Ser. No. 12/769,006, filed Apr. 28, 2010, entitled "TECHNIQUES FOR AUTOMATED GENERATION OF DEPLOYMENT PLANS IN AN SOA DEVELOPMENT LIFECYCLE"; and U.S. Non-Provisional application Ser. No. 12/769,016, filed Apr. 28, 2010, entitled "TECHNIQUES FOR RAPID DEPLOYMENT OF SERVICE ARTIFACTS".

BACKGROUND

Embodiments of the present invention relate generally to software development, and in particular to techniques for facilitating the development of Service Oriented Architecture (SOA) applications.

Software development can be a highly complex and interactive process. In many cases, it involves stakeholders from different organizations and with different perspectives (e.g., solution architects, developers, installation developers, etc.) who must cooperate over an extended period of time to deliver a polished software product.

With the rise in popularity of Service Oriented Architecture (SOA), the challenges of software development have increased rather than lessened. Generally speaking, SOA is a software design paradigm that encapsulates application functionality into loosely-coupled, reusable components, known as services. While SOA provides a number of benefits over more tightly-coupled software architectures, the SOA principles of service reusability, service autonomy, and service composability add additional layers of complexity to the software development lifecycle.

Accordingly, it would desirable to have techniques that facilitate the development of SOA applications.

BRIEF SUMMARY

Embodiments of the present invention provide a framework (referred to herein as Application Integration Architecture, or AIA) that formalizes and orchestrates activities in an SOA development lifecycle. In one set of embodiments, AIA can capture development-related information in a shared data store and cause the information to flow in an automated or semi-automated manner from one lifecycle phase to the next as the lifecycle progresses. This information flow can, in turn, facilitate automations at each lifecycle phase for the responsible stakeholders (e.g., solution architects, developers, installation developers, etc.), thereby enforcing SOA best practices, enhancing development productivity, and ensuring the quality of the final SOA deliverables.

For example, during a first lifecycle phase (e.g., a functional definition phase), AIA can facilitate the definition and decomposition of an SOA application into functional components and persist the functional components in a shared data store.

During a second lifecycle phase (e.g., a service construction phase), AIA can retrieve the functional component definitions persisted in the first lifecycle phase and use the retrieved definitions to automatically generate service artifacts. AIA can also harvest metadata pertaining to the implemented service artifacts and associate the metadata with the functional component definitions in the shared data store.

During a third lifecycle phase (e.g., a deployment plan generation phase), AIA can retrieve the functional component definitions persisted in the first lifecycle phase and the metadata harvested in the second lifecycle phase and used the retrieved definitions and metadata to automatically generate one or more deployment plans.

And during a fourth lifecycle phase (e.g., a deploy phase), AIA can automatically deploy the SOA application artifacts based on the deployment plan generated in the third lifecycle phase.

According to one embodiment of the present invention, a definition of a business process is received by a computer system, where the definition includes a set of business tasks, and where the business process is a functional representation of a Service Oriented Architecture (SOA) Application. Further, a definition of a service solution component for a business task in the set of business tasks is received by the computer system, where the service solution component is a functional representation of a software service that fulfills the business task. The definition of the business process and the definition of the service solution component are then stored by the computer system in a shared data store.

In one embodiment, receiving the definition of the service solution component comprises receiving, from a user, a query for searching a repository of existing software services, the query being configured to find an existing software service that fulfills the business task; executing the query; and if the query execution identifies an existing software service that fulfills the business task, associating the existing software service with the service solution component.

In one embodiment, receiving the definition of the service solution component comprises receiving a description of the desired functionality of the software service.

In one embodiment, the description is free text.

In one embodiment, receiving the definition of the service solution component further comprises receiving a service type for the software service.

In one embodiment, receiving the definition of the service solution component further comprises receiving a product code for the software service.

In one embodiment, at a time of implementing the software service, the definition of the service solution component is retrieved from the shared data store and used to generate one or more artifacts of the software service.

In one embodiment, the one or more artifacts are SOA artifacts.

In one embodiment, once implementation of the software service is complete, metadata pertaining to the software service is associated with the service solution component and stored in the shared data store.

In one embodiment, the metadata includes deployment information for the software service.

In one embodiment, at a time of deploying the SOA application, the definition of the business process is retrieved from the shared data store; a user interface is generated based on the definition of the business process that includes the set of business tasks, the user interface identifying the software service as fulfilling the business task; a selection of the software service is received via the user interface; the metadata pertaining to the software service is retrieved from the shared data store; and a bill of materials for deploying the SOA application is generated based on the metadata.

In one embodiment, a deployment plan is generated based on the bill of materials.

In one embodiment, a deployable package is created for the SOA application.

In one embodiment, the deployable package includes the deployment plan and the one or more artifacts of the software service. In another embodiment, the deployable package further includes the definition of the business process, the definition of the service solution component, and the metadata pertaining to the software service.

A further understanding of the nature and advantages of the embodiments disclosed herein can be realized by reference to the remaining portions of the specification and the attached drawings.

BRIEF DESCRIPTION OF THE DRAWINGS

FIG. 33 illustrates an example deployment properties file in accordance with an embodiment of the present invention.

DETAILED DESCRIPTION

In the following description, for the purposes of explanation, numerous details are set forth in order to provide an understanding of embodiments of the present invention. It will be apparent, however, to one of ordinary skill in the art that certain embodiments can be practiced without some of these details.

Figure 1:
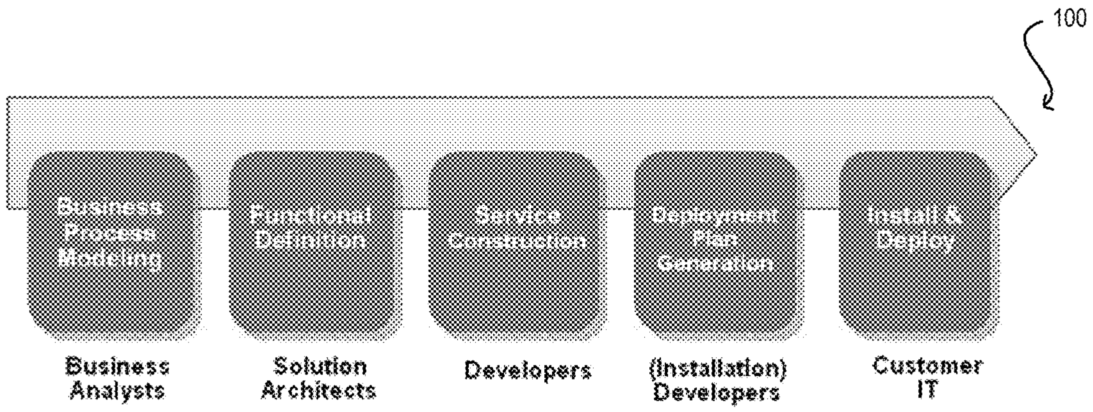
FIG. 1 is a simplified block diagram illustrating an example SOA development lifecycle.

FIG. 1 is a simplified block diagram 100 that illustrates a development lifecycle for an enterprise-class SOA application. Diagram 100 is presented to provide an overview of the activities that are typically carried out in such a lifecycle, as well as the information flows that are typically required between lifecycle phases.

In the first phase ("Business Process Modeling"), a first set of individuals (e.g., business analysts) translate a business process into a model that conveys how business objectives can be carried out in an abstract and application-independent manner.

In the second phase ("Functional Definition"), a second set of individuals (e.g., solution architects) decompose the business process model into a set of business tasks, and further decompose each business task into one or more functional components (referred to herein as service solution components). Each service solution component is a functional representation of a software service that is designed to fulfill its corresponding business task. As part of this process, it is generally desirable for the solution architects to determine whether the functionality of a particular service solution component can be fulfilled by an existing service in the enterprise's SOA portfolio, thereby promoting service reuse.

In the third phase ("Service Construction"), a third set of individuals (e.g., developers) implement software services that correspond to the service solution components defined in the second phase. With existing development methodologies, this generally requires the solution architects to engage with the developers (e.g., via functional design documents, meetings, e-mail, etc.) to communicate the details of the service solution component definitions. This may also require developers to communicate with each other to ensure that all developers are following recommended coding practices.

In the fourth phase ("Deployment Plan Generation"), a fourth set of individuals (e.g., installation developers and/or release management/IT operations) identify the services that collectively fulfill the business process defined in the first and second phases. This collection of services represents the SOA project or application that is ultimately delivered to customers. With existing development methodologies, this generally requires the installation developers to interact with the solution architects and developers to determine which services are to be included in the application, as well as the deployment information for each service (e.g., adapters, queues, schemas, JNDI resources, etc.) and the relationships/dependencies between service artifacts.

In the fifth phase ("Deploy") a fifth set of individuals (e.g., customer IT) deploy the packaged SOA application at a customer site. With existing methodologies, this generally requires customer IT to create and execute one or more deployment scripts. When the content to be deployed changes over time or the topology on which the deployment occurs changes, customer IT must generally coordinate with development teams to understand the relationship between the artifacts being deployed and how they should be configured for a specific topology. Customer IT must then recreate or modify the deployment scripts accordingly.

As can be seen, the SOA development lifecycle is a complex process that requires a significant amount of collaboration and information sharing between the stakeholders involved at each lifecycle phase. For example, information regarding service solution components needs to be passed from solution architects in the second phase to developers in the third phase, information regarding implemented services and associated deployment information needs to be passed from developers in the third phase to installation developers in the fourth phase, and so on.

Embodiments of the present invention provide a framework (referred to herein as Application Integration Architecture, or AIA) that facilitates information flow between the foregoing lifecycle phases by formalizing and orchestrating the SOA development lifecycle. In particular, AIA can capture development-related information in a shared data store and cause the information to flow in an automated or semi-automated manner from one lifecycle phase to the next as the lifecycle progresses. This information flow can, in turn, enable automations at each lifecycle phase for the responsible stakeholders (e.g., solution architects, developers, installation developers, etc.), thereby enforcing SOA best practices, enhancing development productivity, and ensuring the quality of the final SOA deliverables.

AIA can include, inter alia:

Project Lifecycle Workbench to, e.g., facilitate the definition and decomposition of an SOA application into service solution components and persist the service solution components in a shared data store;

Service Constructor to, e.g., retrieve the service solution components stored in the shared data store and use the retrieved definitions to automatically generate artifacts for services;

Harvester to, e.g., harvest metadata pertaining to the implemented service artifacts and associate the metadata with the service solution components in the shared data store;

Deployment Plan Generator to, e.g., retrieve the service solution component definitions and harvested metadata of the implemented services from the shared data store and use the retrieved definitions and metadata to automatically generate a deployment plan; and Installation Driver to, e.g., automatically deploy the SOA application based on the generated deployment plan against any server and any desired topology.

Figure 2:
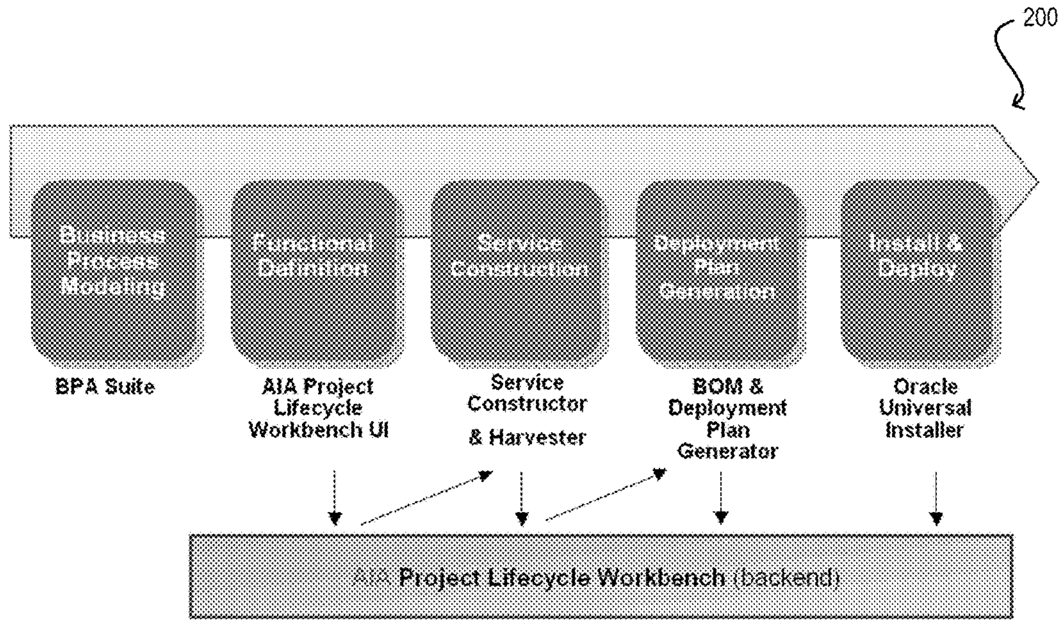
FIG. 2 is a simplified block diagram illustrating the SOA development lifecycle of FIG. 1 as enhanced by AIA in accordance with an embodiment of the present invention.

FIG. 2 is a simplified block diagram 200 that illustrates, for a particular embodiment, how the foregoing AIA components interact and when they may be used during the course of an SOA development lifecycle. The following sections describe each of these components in further detail.

Project Lifecycle Workbench

Project Lifecycle Workbench (PLW) is a software application that can be implemented as a Web-based application, proprietary client-server application, or the like. In various embodiments, PLW can provide a centralized user interface for managing SOA development lifecycle activities in a streamlined manner.

As discussed above with respect to FIG. 1, in the Functional Definition lifecycle phase, solution architects build upon the modeling work of business analysts and define a business process in terms of business tasks and constituent service solution components. A service solution component is the mechanism via which a solution architect conveys to his/her development stakeholders that a service is needed to fulfill a desired business functionality. In the prior art, this information was typically conveyed to development in the form of functional design documents drafted by the solution architects.

In embodiments of the present invention, PLW can enable a solution architect to enter business tasks and functional requirements for constituent service solution components directly into the AIA system. In this manner, all of the functional definitions can be captured and persisted in a shared data store (e.g., the PLW backend shown in FIG. 2), and can automatically flow downstream to other lifecycle phases (e.g., the Service Construction lifecycle phase and the Deployment Plan Generation lifecycle phase). In certain embodiments, these functional definitions can also be automatically populated in the PLW backend from another process or application, as a business process modeling application.

Figure 3:
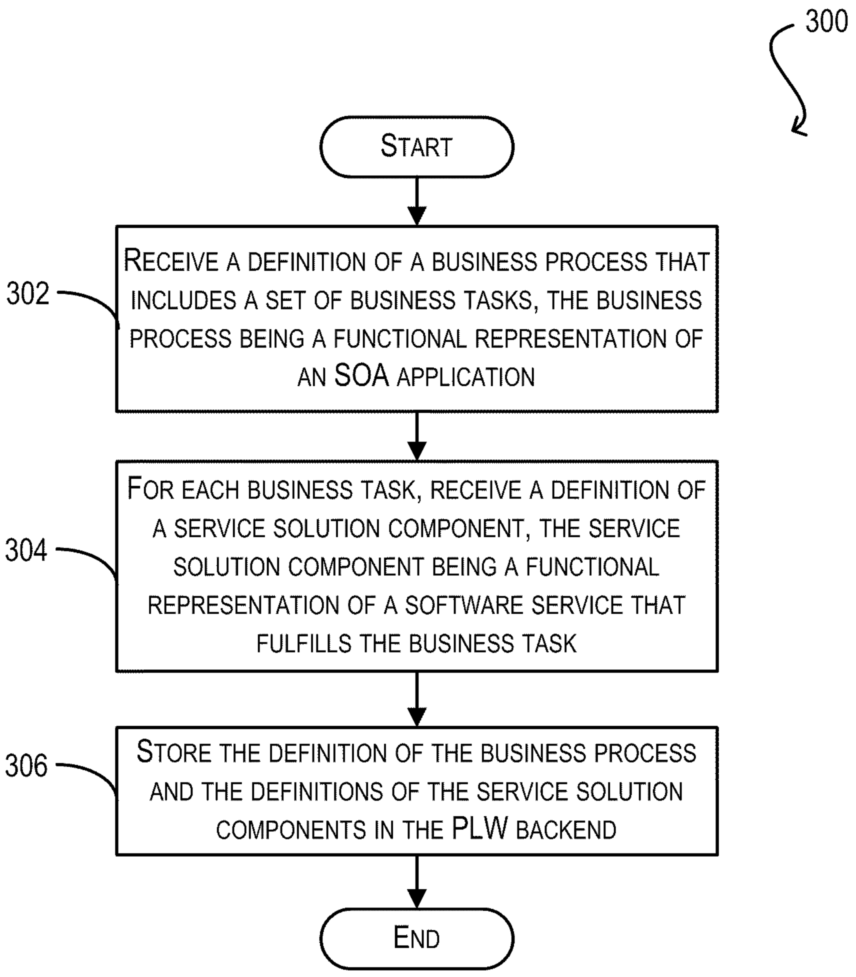
FIG. 3 is a flow diagram illustrating a process for capturing a functional representation of an SOA application (e.g., a business process definition including business tasks and service solution components) in accordance with an embodiment of the present invention.

FIG. 3 is flow diagram of a process 300 for capturing a functional representation of an SOA application (e.g., a business process definition including business tasks and service solution components) via PLW according to an embodiment of the present invention. In various embodiments, process 300 can be carried out during the Functional Definition lifecycle phase of the application. Portions of process 300 can be implemented in software, hardware, or a combination thereof. As software, process 300 can be encoded as program code stored on a computer-readable storage medium.

Figure 4:
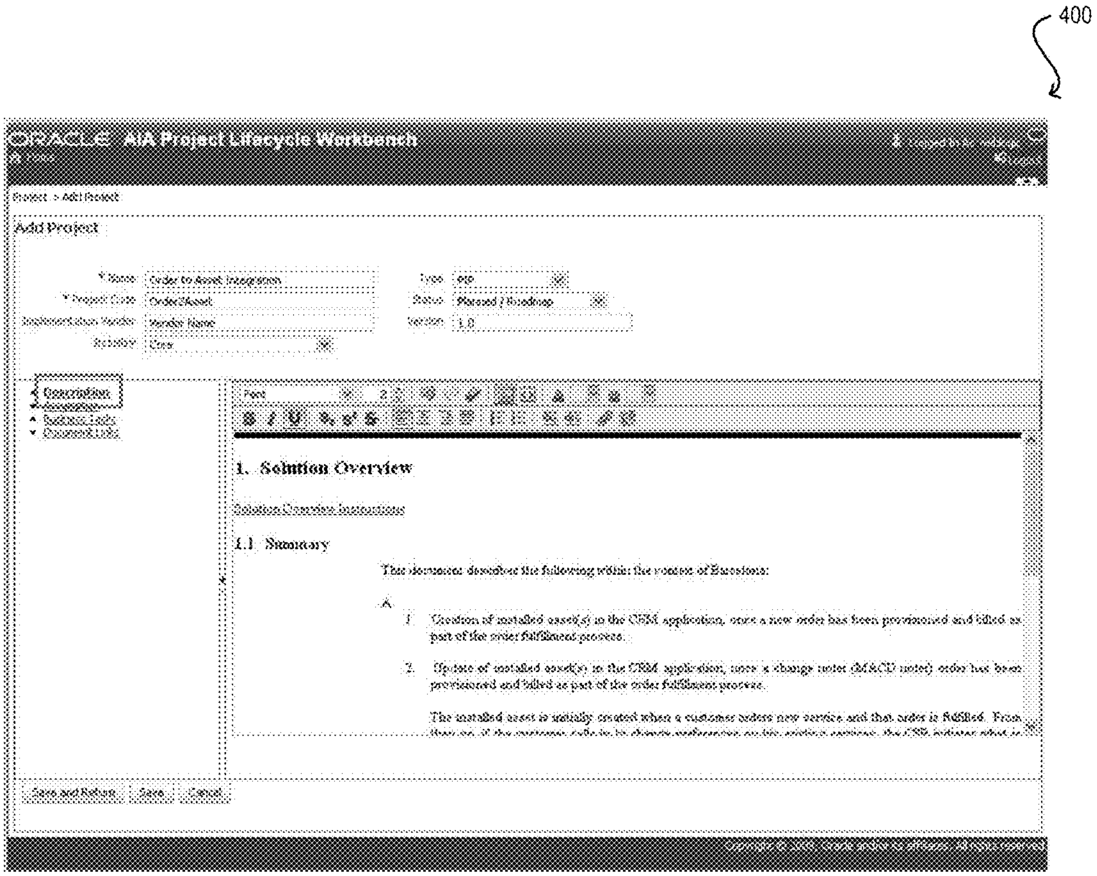
FIGS. 4-10 are screenshots of user interfaces for carrying out the process of FIG. 3 in accordance with an embodiment of the present invention.
Figure 5:
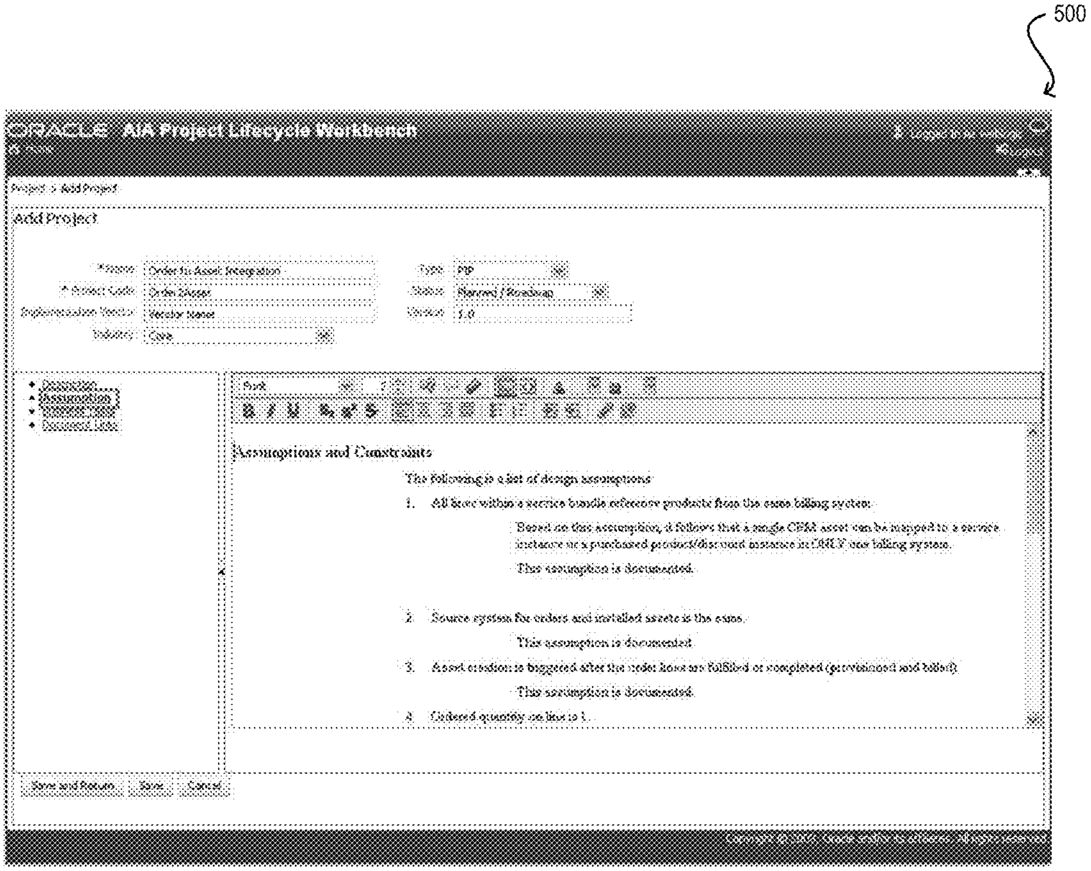
Figure 7:
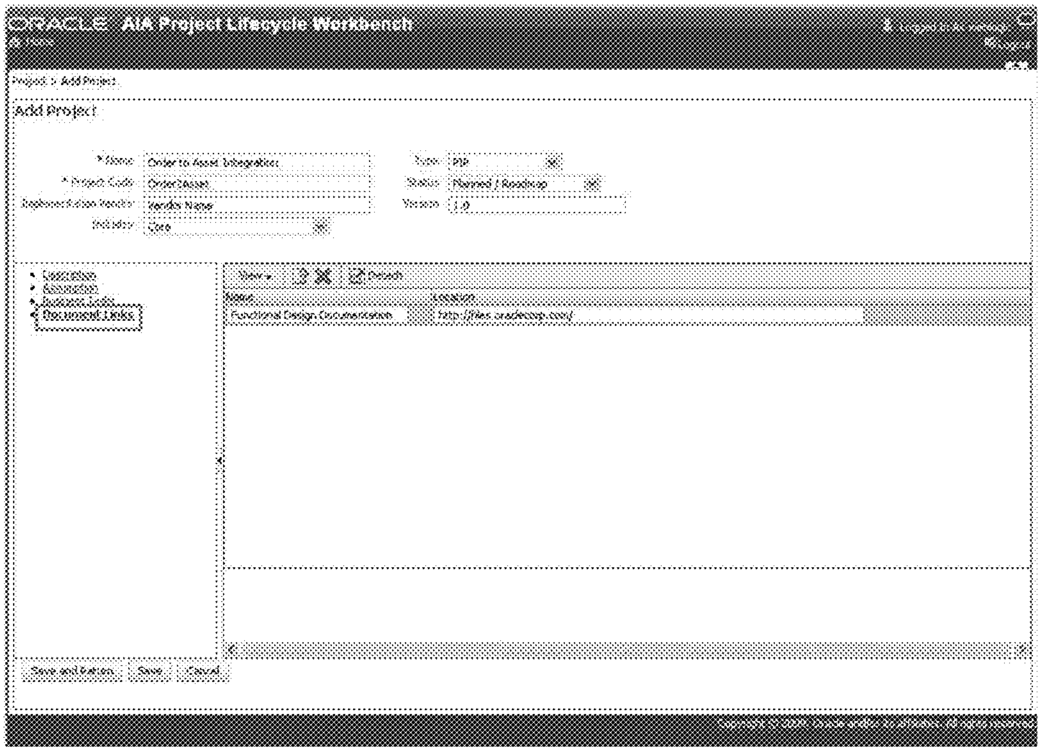

At block 302, PLW can receive a definition of a business process, where the business process is a functional representation of an SOA application. The business process definition can include attributes such as name, type, project code, status, implementation vendor, version, and industry. In addition, the process definition can include a description attribute that provides an overview of the process, an assumptions attribute that describes various design assumptions and constraints, and one or more documents links that link to associated documents (e.g., functional design documents). FIGS. 4, 5, and 7 illustrate example PLW user interfaces 400, 500, and 700 that can be generated to facilitate entry of this information.

Figure 6:
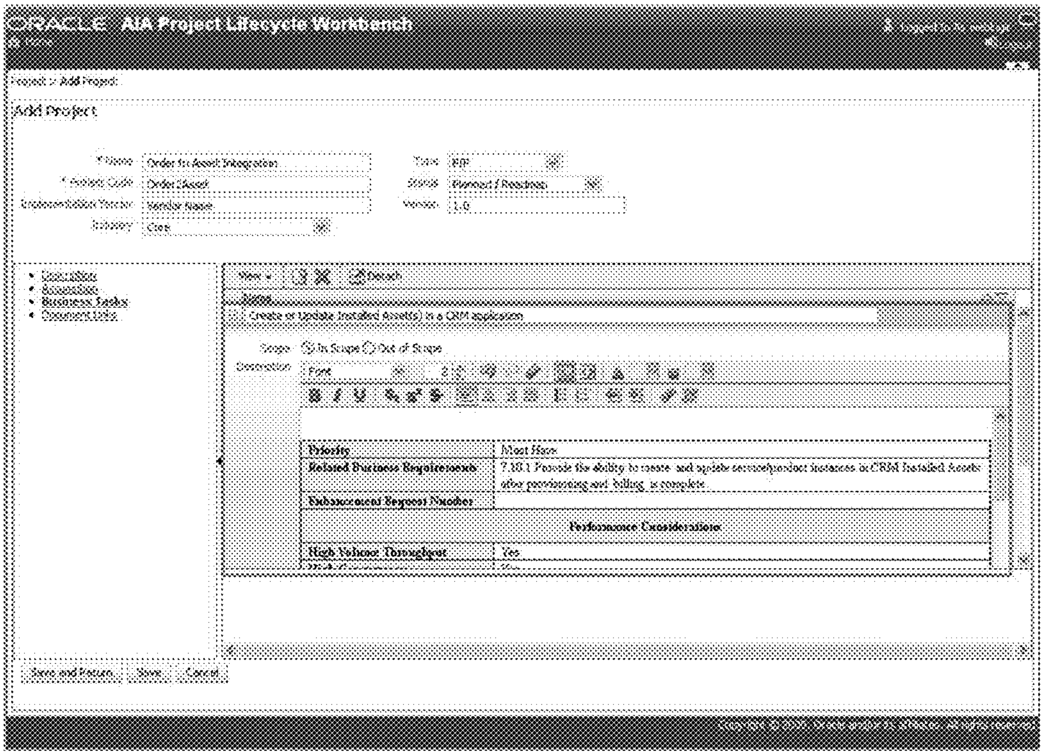

In one set of embodiments, the business process definition received at block 302 of FIG. 3 can also include a set of business tasks (and groupings of tasks known as business activities). These business tasks specify business logic that, taken together, address the business requirements of the overall business process. In certain embodiments, each business task will eventually be fulfilled by one or more executable services. FIG. 6 illustrates an example PLW user interface 600 for adding business tasks to a process.

Figure 8:
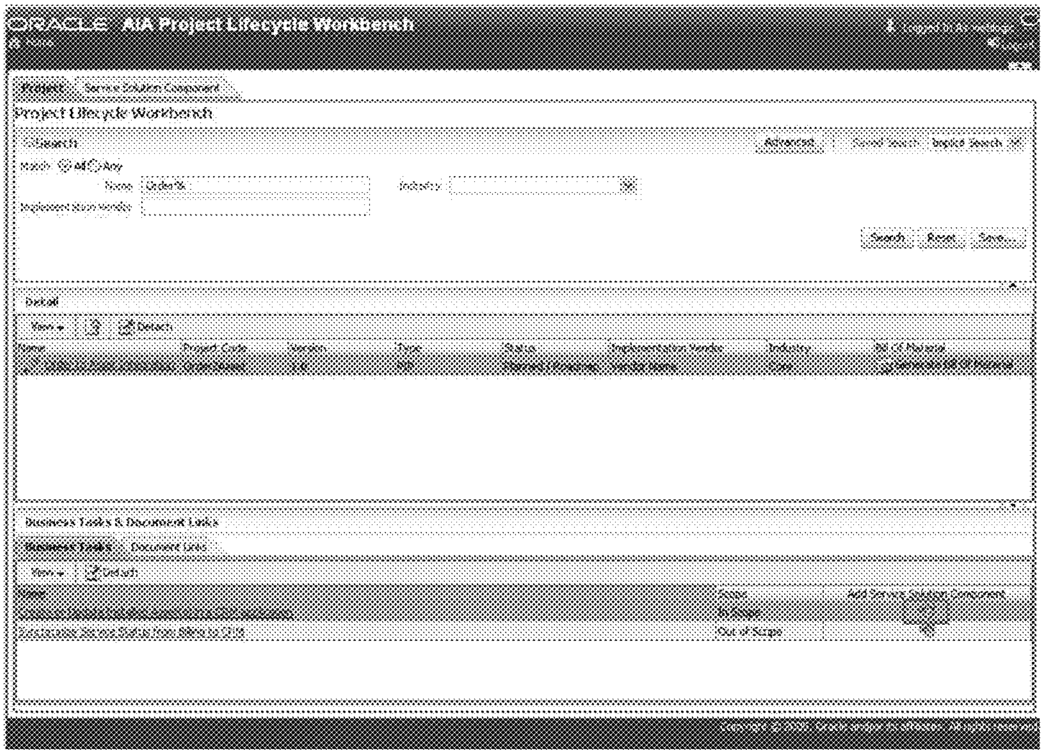
Figure 9:
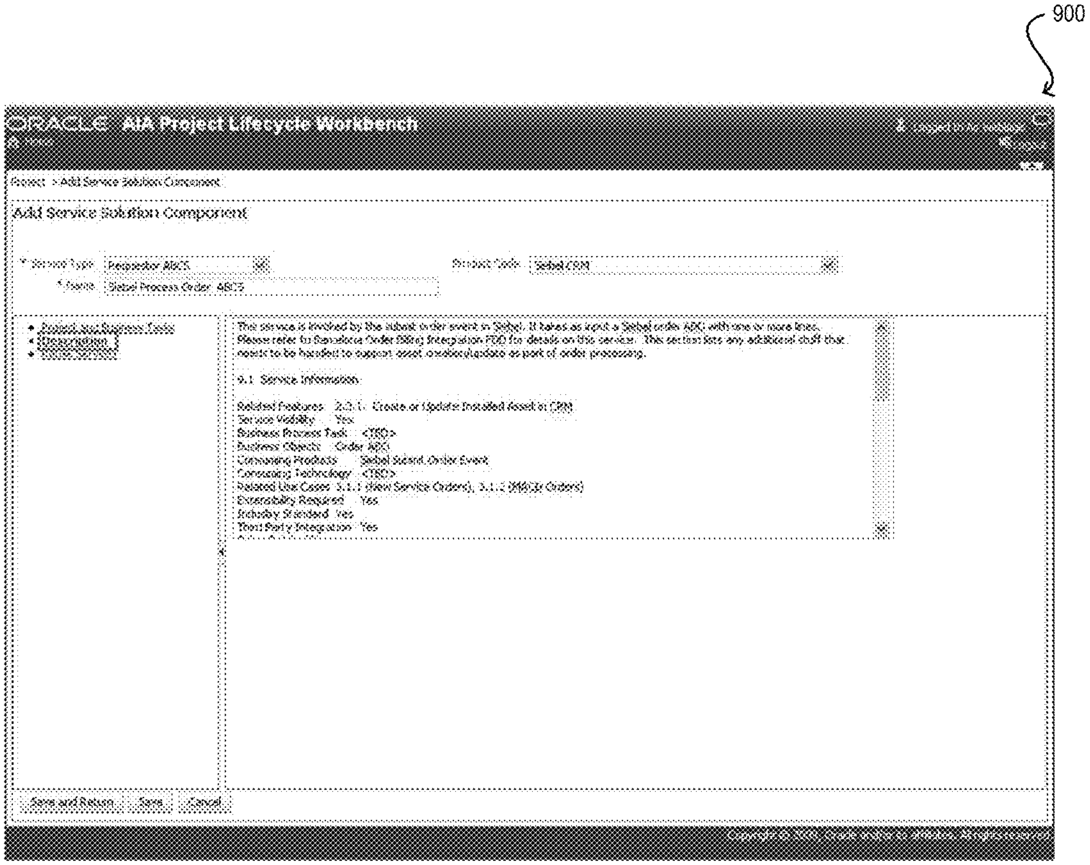

Once a business process definition (including constituent business tasks) is received, PLW can receive, for each business task, a definition of a service solution component (block 304 of FIG. 3). As described above, a service solution component is a functional representation of a software service that fulfills its corresponding business task. FIG. 8 illustrates an example PLW user interface 800 for adding a new service solution component to the task "Create or Update Installed Asset(s) in a CRM Application," and FIG. 9 illustrates an example PLW user interface 900 for editing the attributes of the service solution component. As shown in FIG. 9, these attributes can include name, service type, and product code. In addition, a user (e.g., solution architect) can enter a free-text description of the desired functionality of the service to be implemented via the "Description" link, and can associate an existing service with the service solution component via the "Reuse Services" link. The notion of searching for and reusing existing services is described in further detail with respect to FIGS. 11 and 12 below.

Figure 10:
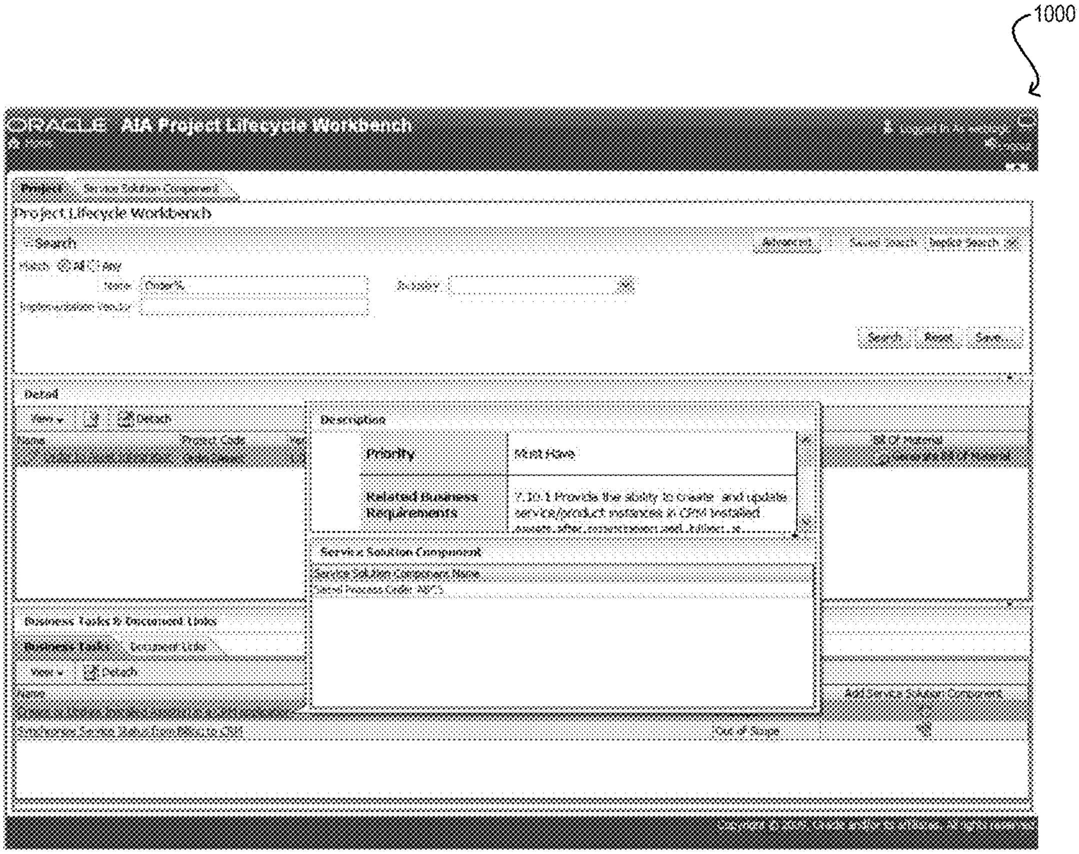

At block 306 of FIG. 3, the business process definition and constituent service solution component definitions can be stored in a shared data store in the PLW backend. FIG. 10 illustrates an example PLW user interface 1000 that shows the service solution component "Siebel Process Order ABCS" defined in FIG. 9 as being associated with the "Create or Update Installed Asset(s) in a CRM Application" task. By persisting the business process and service solution component definitions in this manner, they can be automatically accessed in subsequent lifecycle phases (e.g., Service Construction lifecycle phase, Deployment Plan Generation lifecycle phase, etc.) and facilitate various automations in those phases.

It should be appreciated that process 300 is illustrative and that variations and modifications are possible. For example, steps described as sequential may be executed in parallel, order of steps may be varied, and steps may be modified, combined, added, or omitted. One of ordinary skill in the art would recognize other variations, modifications, and alternatives.

Figure 11:
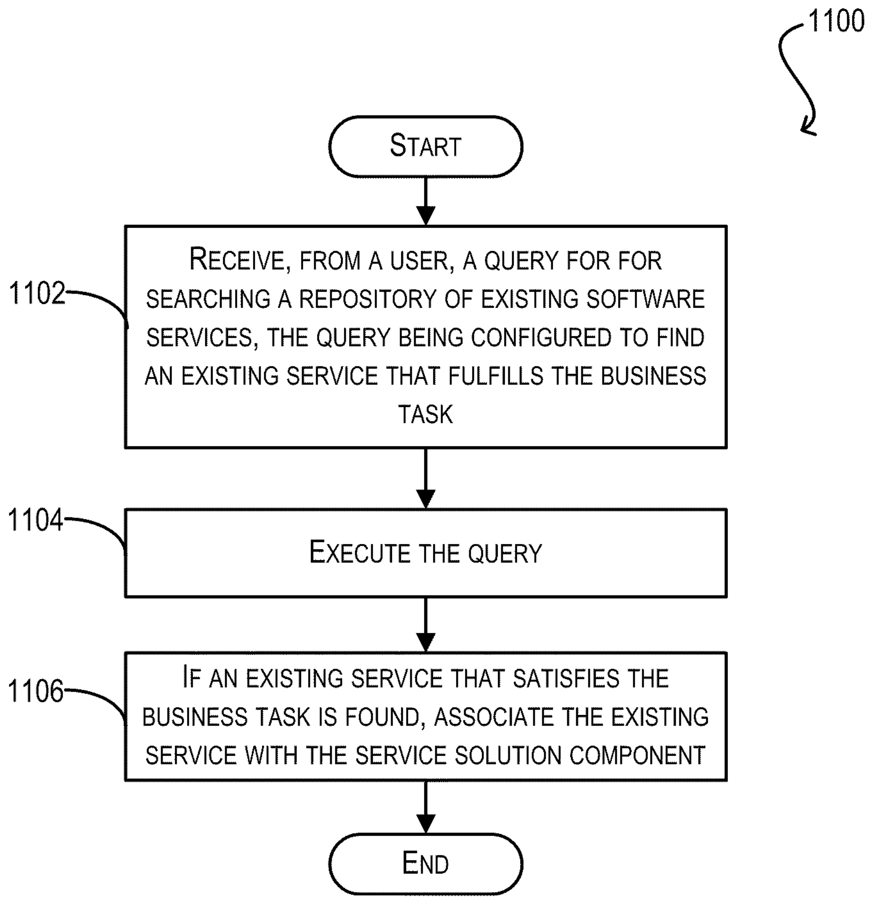
FIG. 11 is a flow diagram illustrating a process for identifying an existing service for fulfilling a business task in accordance with an embodiment of the present invention.

As noted above, PLW can provide a mechanism that allows solution architects to search for existing services that may fulfill the functional requirements of a particular service solution component. This obviates the needs to implement a new service for the service solution component at the Service Construction phase and thereby promotes a guiding principle of SOA, which is service reuse. FIG. 11 is a flow diagram of a process 1100 for identifying existing services according to a embodiment of the present invention. In one set of embodiments, process 1100 can performed as part of block 304 of FIG. 3 (e.g., receiving a definition of a service solution component).

Figure 12:
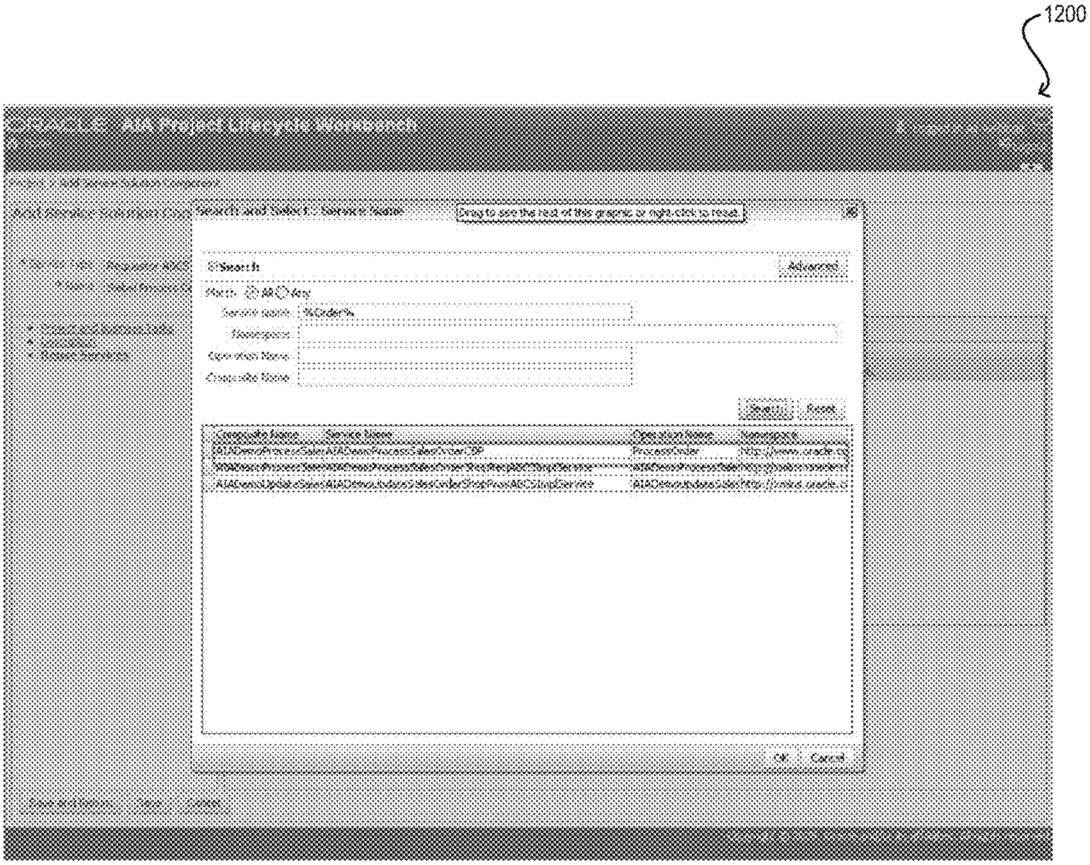
FIG. 12 is a screenshot of a user interface for carrying out the process of FIG. 11 in accordance with an embodiment of the present invention.

At block 1102, PLW can receive from a user (e.g., a solution architect) a query for searching a service repository, where the query is configured to find an existing service that fulfills the requirements of a particular service solution component/business task. FIG. 12 illustrates an example PLW user interface 1200 that shows a dialog for entering such a search query. In various embodiments, the service repository can provide an up-to-date view of services that have already been implemented and/or deployed. In addition, the service repository can be automatically categorized according to a predefined structure to facilitate searching.

Once the query is executed and a reusable existing service is found, PLW can associate the existing service with the service solution component (blocks 1104, 1106 of FIG. 11). This association can be stored in the shared data store and can be used, e.g., during deployment plan generation to pull the metadata for that existing service into the deployable package.

It should be appreciated that process 1100 is illustrative and that variations and modifications are possible. For example, steps described as sequential may be executed in parallel, order of steps may be varied, and steps may be modified, combined, added, or omitted. One of ordinary skill in the art would recognize other variations, modifications, and alternatives.

In addition to capturing functional definitions (during the Functional Definition lifecycle phase), in certain embodiments PLW can also be used to facilitate the identification of implemented services that should be deployed as part of an SOA application (during the Deployment Plan Generation lifecycle phase). This functionality is described in further detail in the "Deployment Plan Generator" section below.

Service Constructor

Figure 13:
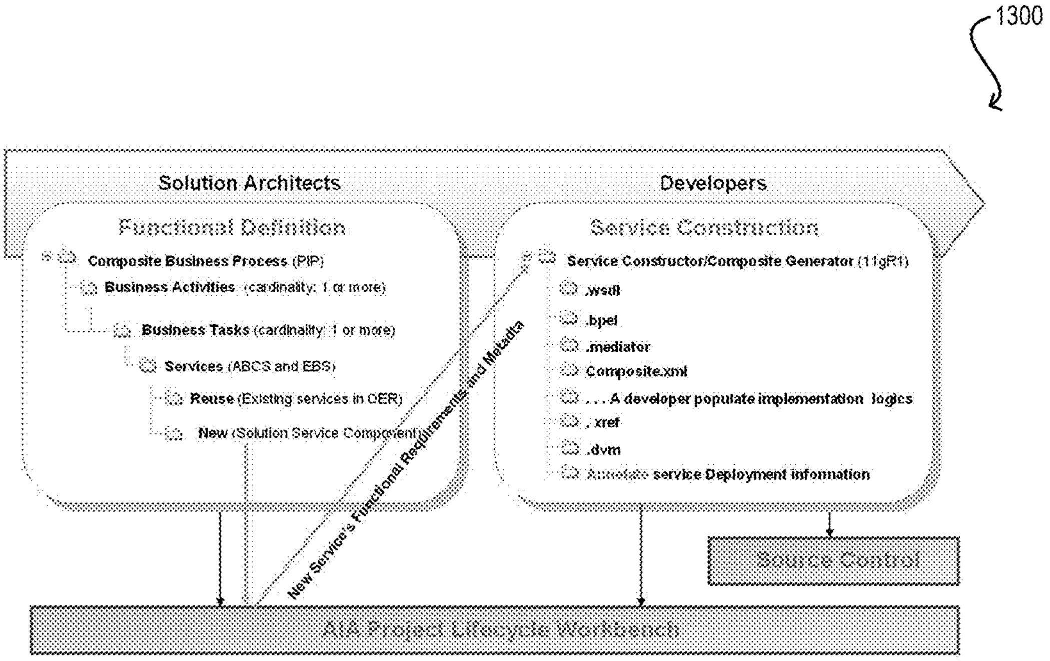
FIG. 13 is a simplified block diagram illustrating the flow of information from the functional definition lifecycle phase to the service construction lifecycle phase in accordance with an embodiment of the present invention.

Once business process and service solution component definitions have been entered and stored in the PLW backend during the Functional Definition lifecycle phase, this information can be accessed and leveraged to automatically generate service artifacts during the Service Construction lifecycle phase using an AIA tool known as the Service Constructor. FIG. 13 is a simplified block diagram 1300 illustrating the flow of this functional information between the Functional Definition and Service Construction phases.

The Service Constructor provides a number of benefits over prior art approaches to service development. For example, by retrieving functional definitions from the PLW backend, the Service Constructor can automate most (if not all) of the information exchange that was previously performed manually between solution architects and developers. Further, by automatically generating portions of service artifacts, the Service Constructor can promote coding best practices and enforce a particular programming model. Yet further, the Service Constructor can auto-populate many implementation details based on the previously defined functional information, thereby improving development productivity.

In one set of embodiments, the Service Constructor can be implemented as a plug-in or extension for an integrated development environment, such as Oracle JDeveloper. In other embodiments, the Service Constructor can be implemented as a standalone program.

Figure 14:
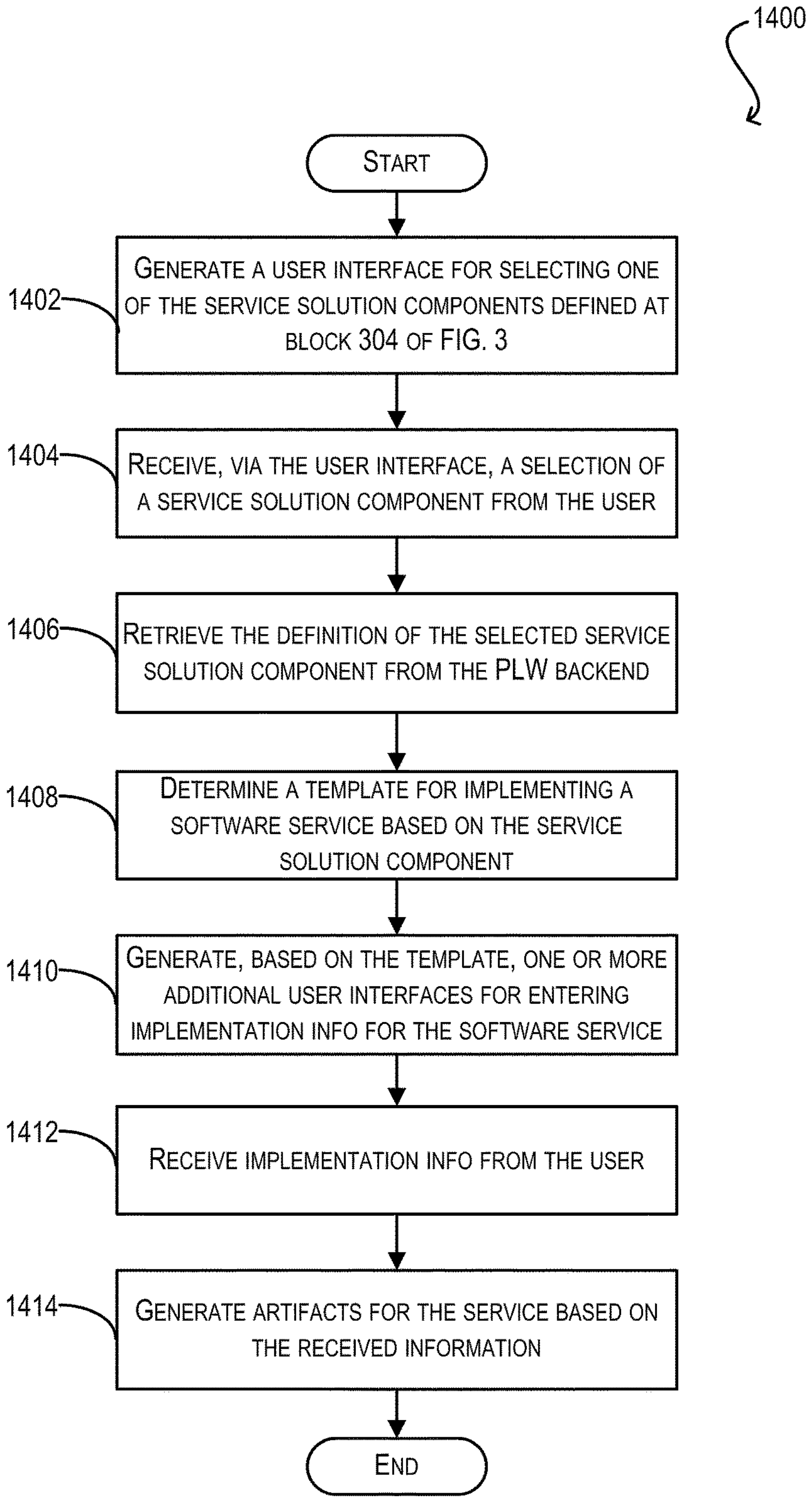
FIG. 14 is a flow diagram illustrating a process for automatically generating service artifacts in accordance with an embodiment of the present invention.

FIG. 14 is flow diagram of a process 1400 for automatically generating service artifacts via the Service Constructor according to an embodiment of the present invention. Portions of process 1400 can be implemented in software, hardware, or a combination thereof. As software, process 1400 can be encoded as program code stored on a computer-readable storage medium.

Figure 15:
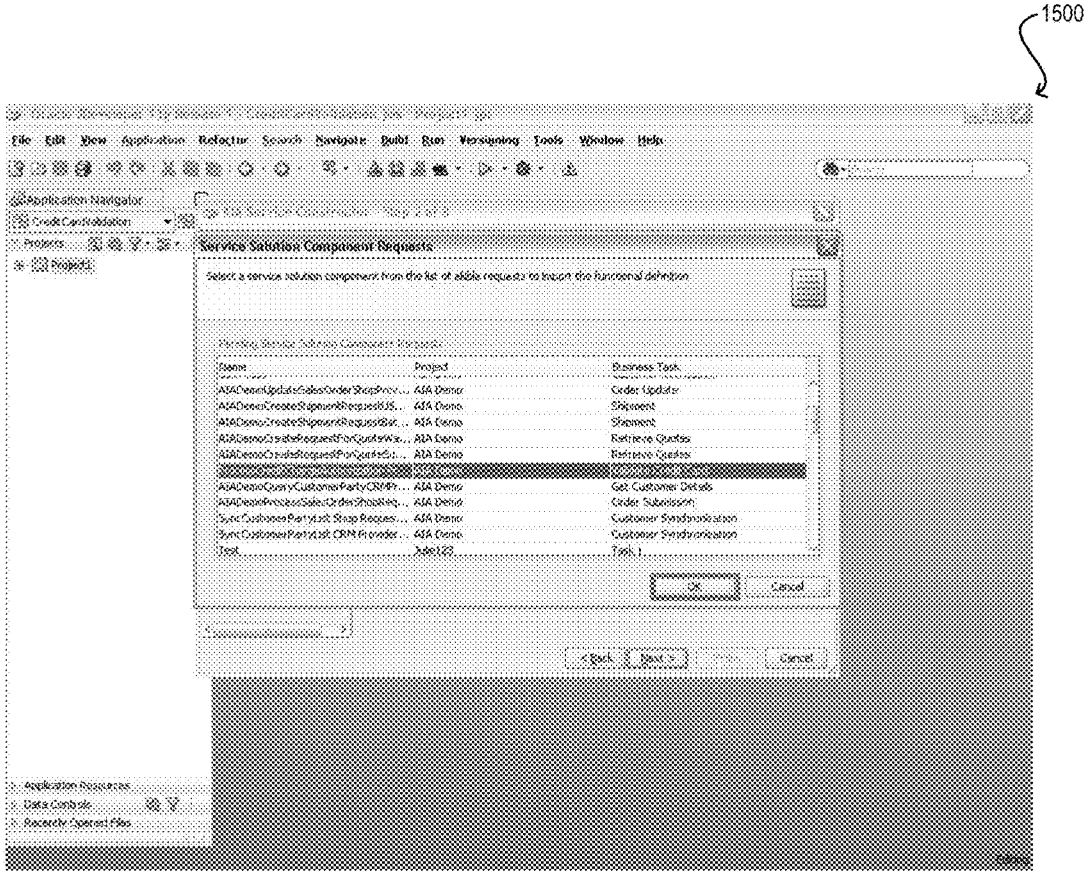
FIGS. 15-23 are screenshots of user interfaces for carrying out the process of FIG. 14 in accordance with an embodiment of the present invention.

At block 1402, the Service Constructor can generate a user interface for selecting one of the service solution components defined at block 304 of FIG. 3. FIG. 15 illustrates an example Service Constructor user interface 1500 for performing such a selection. Generally speaking, user interface 1500 will be presented to a user (e.g., developer) that is tasked with implementing a software service for a particular service solution component. Accordingly, user interface 1500 can display a list of all of the service solution components that have been defined in the system by solution architects, but have not yet been implemented. From the list, the developer can select the particular service solution component that he/she has been tasked to develop (block 1404).

Once a service solution component has been selected, the Service Constructor can retrieve the definition of the service solution component from the shared data store in the PLW backend and present one or more additional user interfaces to the developer (e.g., a “wizard” UI flow) (block 1410). These user interfaces can allow the developer to overwrite one or more aspects of the service solution component definition (for example, in response to business requirement changes that have come to light since the solution architect entered the function definition into the system). The user interfaces can also allow the developer to enter implementation information pertaining to the service.

In a particular embodiment, the Service Constructor can select a predefined template for the service solution component based on an attribute (e.g., service type) in the component’s functional definition, and use the predefined template to determine what information will be gathered from the developer via the wizard interface (block 1408).

Figure 16:
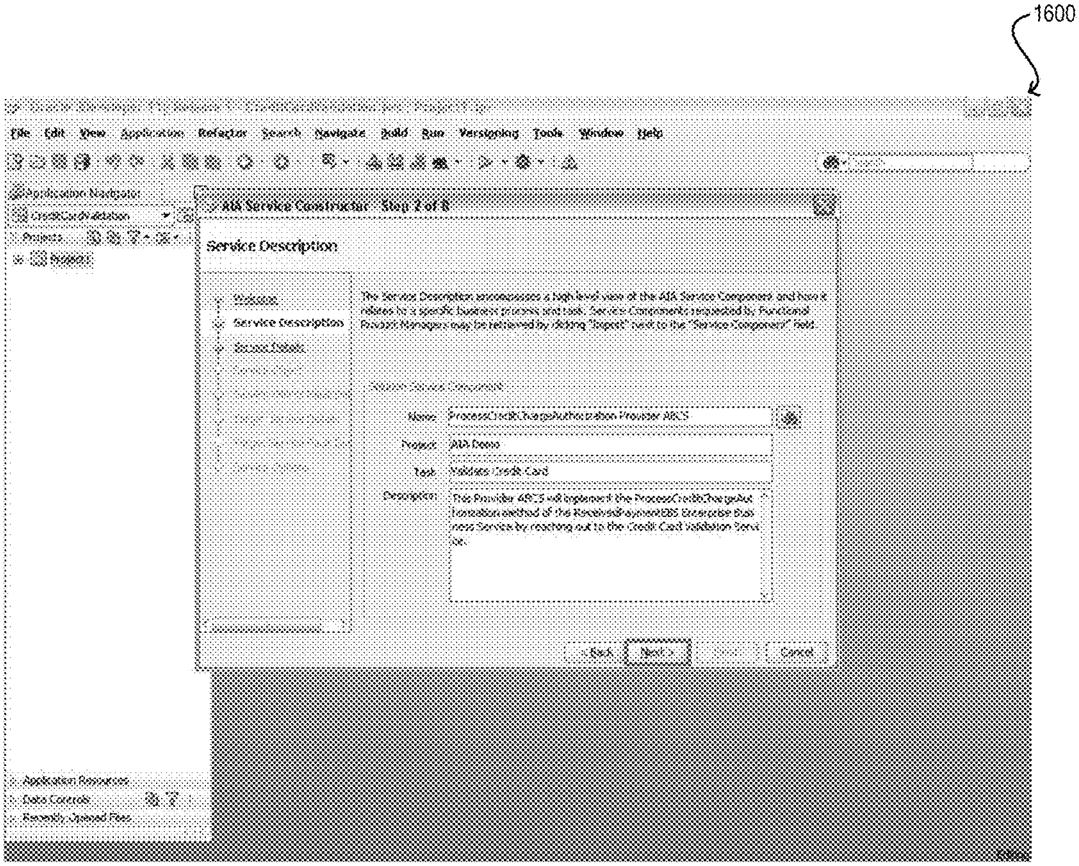
Figure 17:
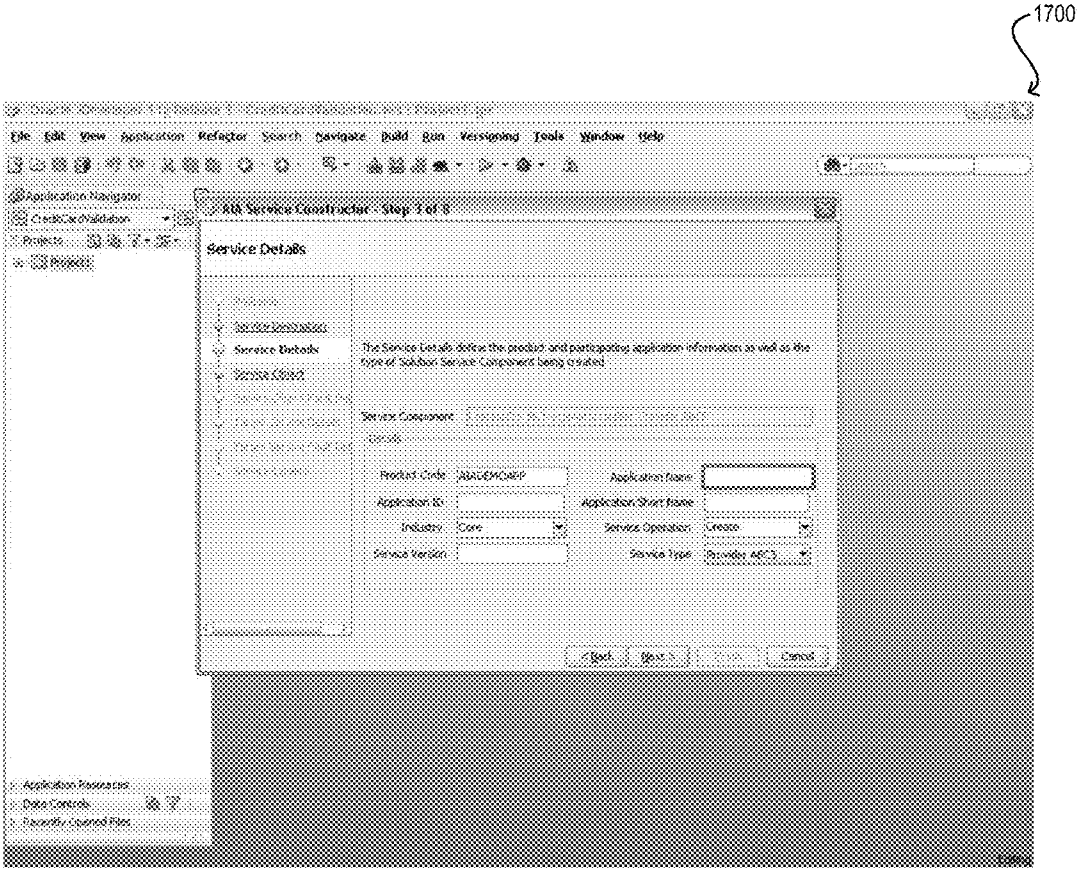
Figure 18:
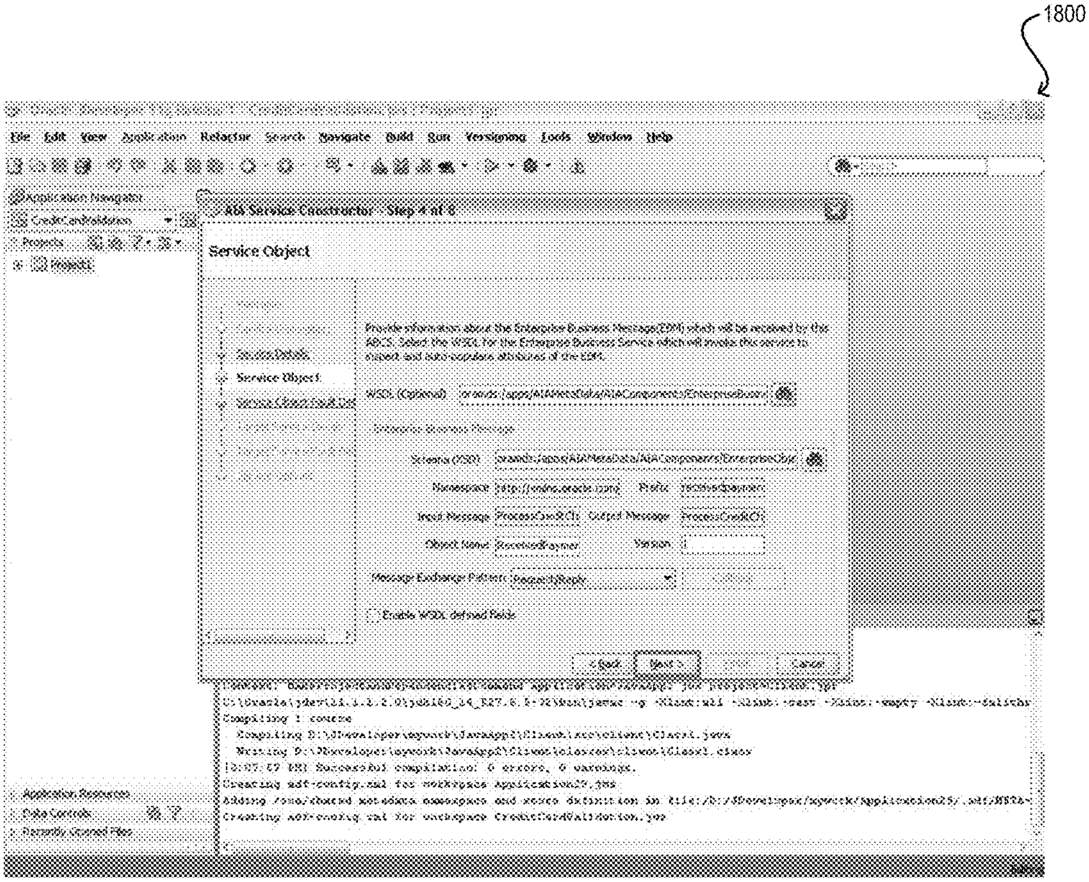
Figure 19:
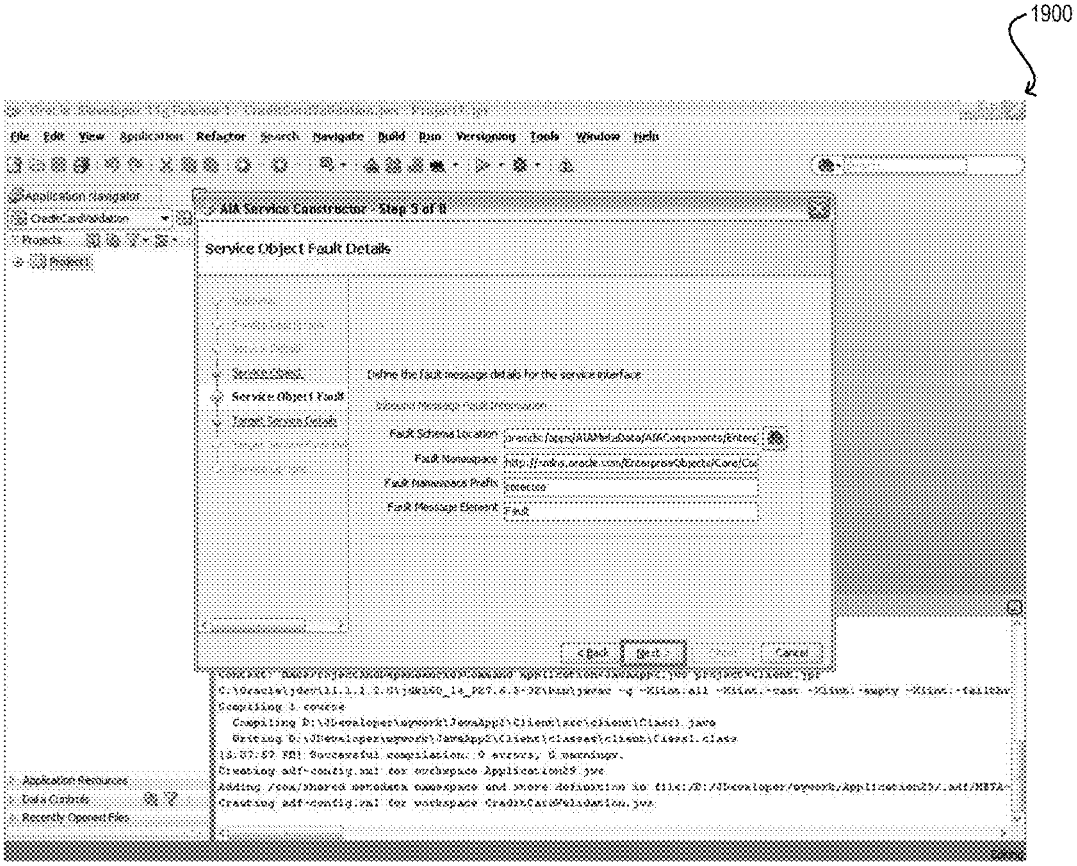
Figure 20:
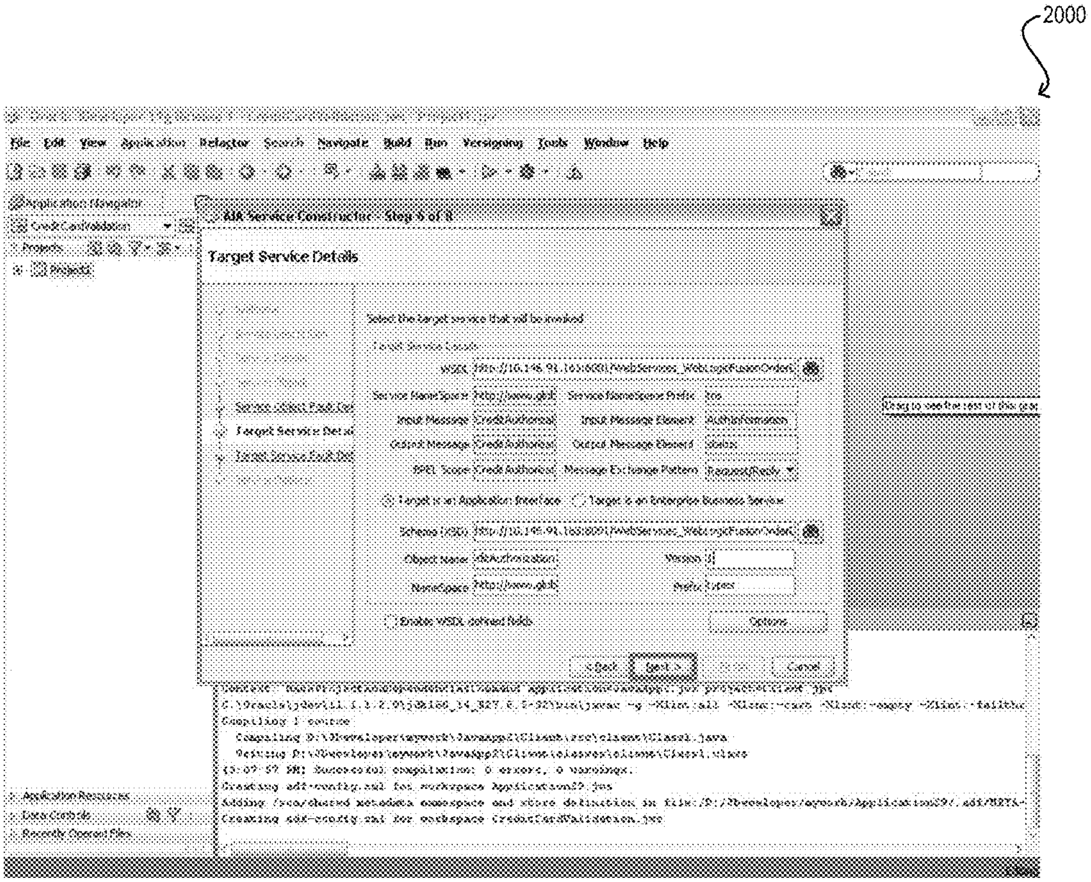
Figure 21:
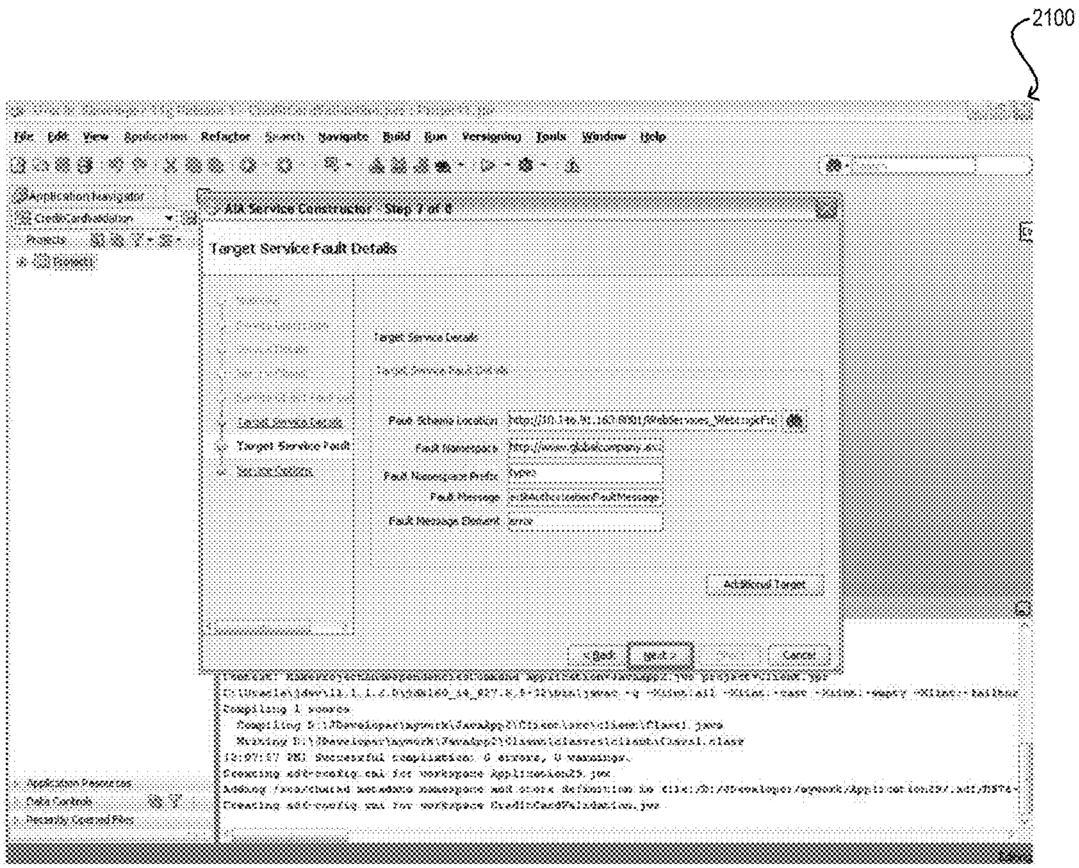
Figure 22:
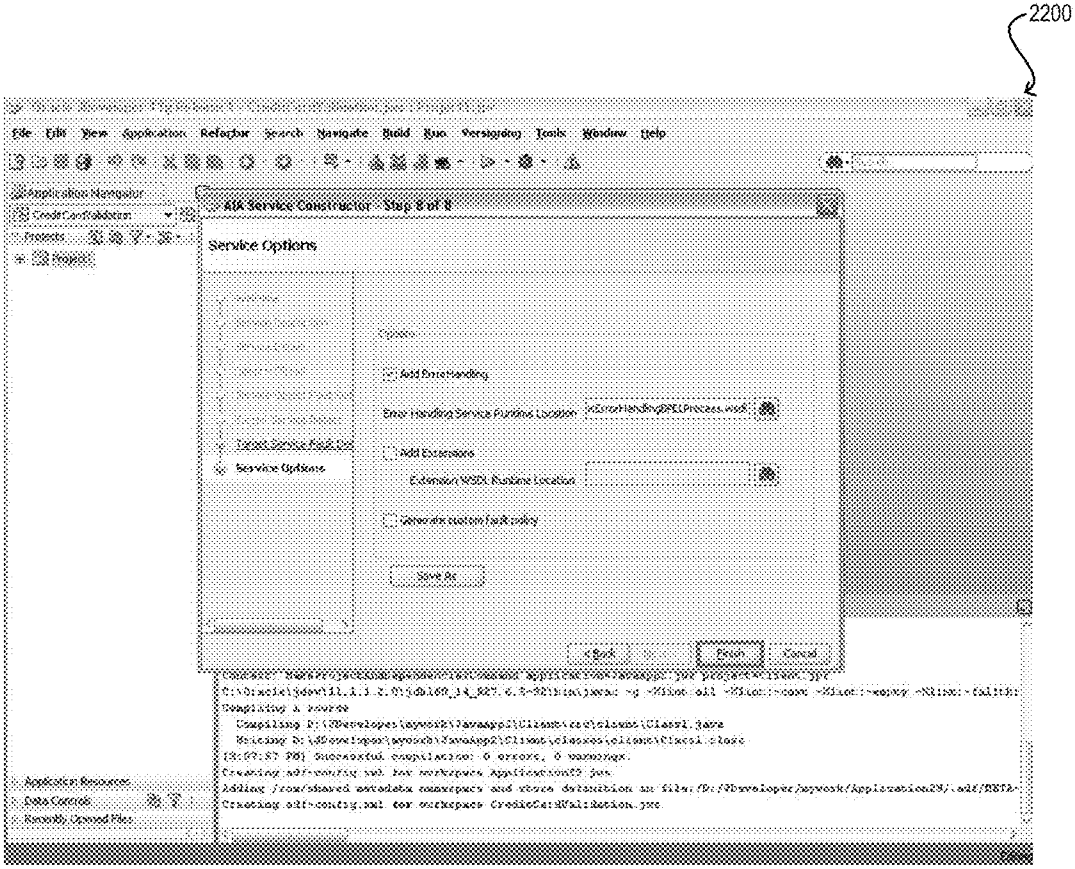

FIGS. 16 and 17 illustrate example Service Constructor user interfaces 1600 and 1700 that depict a service solution component definition that has been imported into the Service Constructor. As shown, the developer can overwrite various attributes that were defined during the Functional Definition lifecycle phase, such as description, service type, product code, and the like. In addition, the developer can add additional functional information.

FIGS. 18-22 illustrate example Service Constructor user interfaces 1800, 1900, 2000, 2100, and 2200 for entering service implementation details. As shown, these details can include message exchange patterns used by the service, target service information, service options, and deployment-related information. Where possible, the Service Constructor can auto-populate certain fields in user interfaces 1800, 1900, 2000, 2100, and 2200 based on information entered in other fields. For example, in user interface 1800, the Service Constructor can auto-populate the fields under “Enterprise Business Message” based on a particular WSDL file selected by the developer.

Figure 23:
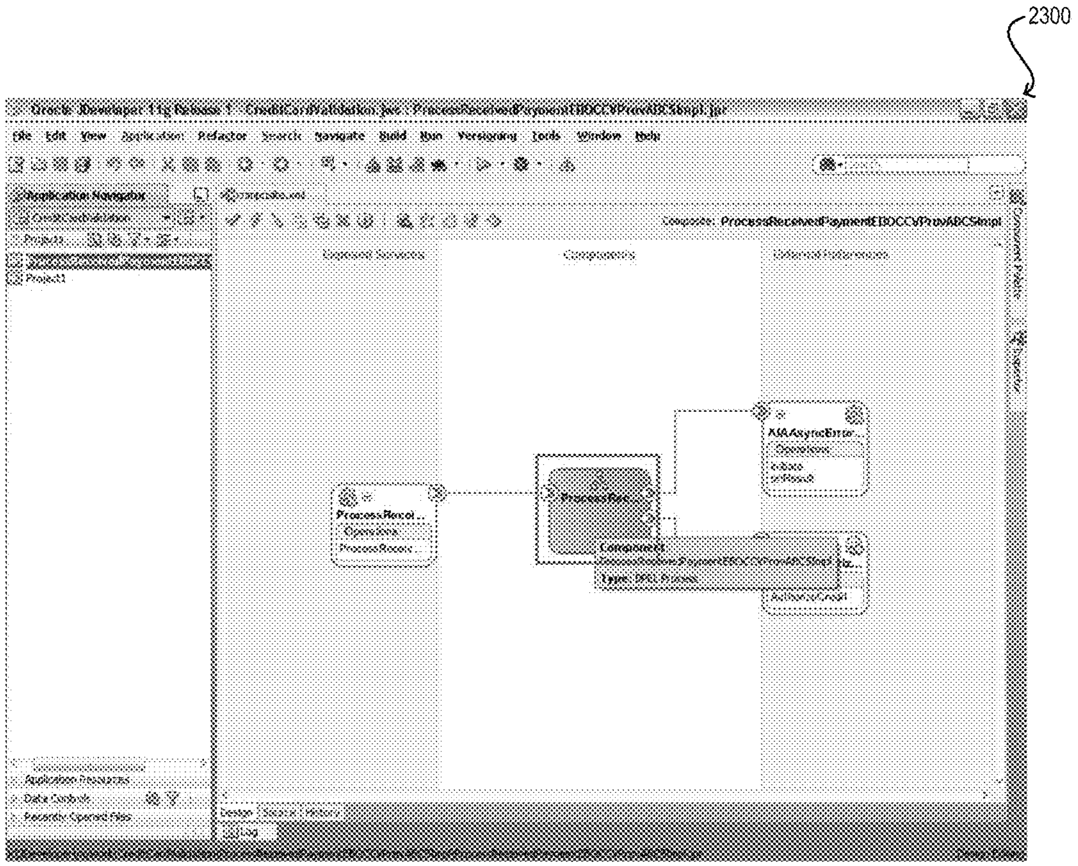

Returning to FIG. 14, once all of the requested implementation information is received from the developer (block 1412), the Service Constructor can automatically generate, based on the gathered information and the functional definition imported from PLW, a “skeleton” of service artifacts for fulfilling the functionality of the selected service solution component (block 1414). The service artifacts (which can include skeleton WSDLs, skeleton composites, skeleton BPELs, etc.) can then be further developed and enriched by the developer to meet the full functional specification of the service solution component. FIG. 23 illustrates an example user interface 23 showing a schematic view of service artifacts as generated by the Service Constructor.

In certain embodiments, the auto-generated skeleton can incorporate code practices and architectural patterns that ensure that the resulting service is extensible and upgrade-safe. In this manner, a degree of coding uniformity can be imposed on the development process, even if services are implemented by different developers (possibly from different organizations).

Although not shown in FIG. 14, once development of a service has been completed, the developer can invoke an AIA tool known as the Harvester to publish metadata related to the service artifacts to the PLW backend (described in further detail below). The developer can also check-in the service artifacts into source control.

It should be appreciated that process 1400 is illustrative and that variations and modifications are possible. For example, steps described as sequential may be executed in parallel, order of steps may be varied, and steps may be modified, combined, added, or omitted. One of ordinary skill in the art would recognize other variations, modifications, and alternatives.

Harvester

The Harvester is an AIA client program that collects metadata related to an implemented service and publishes that metadata to the shared data store in the PLW backend. Upon receipt of this metadata, PLW can associate the metadata with the service solution components and/or business tasks entered by solution architects during the Functional Definition lifecycle phase, and store these associations in the shared data store. Examples of metadata collected by the Harvester include deployment information about a service, relationships between service artifacts (e.g., an asset graph), and functional definition information that may have been updated or overwritten by the developers. In certain embodiments, this harvested metadata can be used during the Deployment Plan Generation lifecycle phase to facilitate the automated generation of a deployment plan.

In one set of embodiments, the Harvester can be implemented as a command-line program. In other embodiments, the Harvester can be implemented as a development program plug-in, similar to the Service Constructor.

In some embodiments, the Harvester can also be used to gather information about an SOA application that has already been deployed at a customer site. This harvested information can be published to the service repository (discussed with respect to FIG. 11) to maintain an up-to-date list of deployed services that can be subsequently reused.

Deployment Plan Generator

As discussed with respect to FIG. 1, in the Deployment Plan Generation lifecycle phase, installation developers are responsible for identifying and packaging together all of the services that make up an SOA application. In the prior art, this process typically required the installation developers to contact the solution architects and developers to determine (1) the services to be included in the application and (2) the deployment information for each service. Based on this information, the installation developers would manually create a deployment script.

Figure 24:
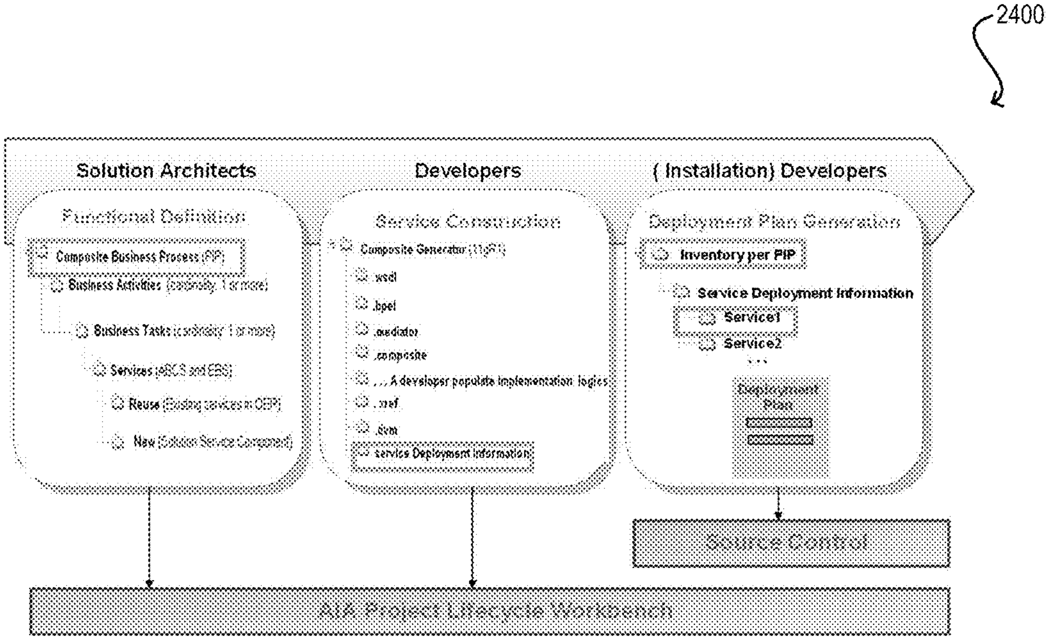
FIG. 24 is a simplified block diagram illustrating the flow of information from the functional definition and service construction lifecycle phases to the deployment plan generation lifecycle phase in accordance with an embodiment of the present invention.

Embodiments of the present invention can automate this process via a tool known as the Deployment Plan Generator. In conjunction with PLW, the Deployment Plan Generator can enable a user (e.g., installation developer) to pick and choose implemented services to be included in a given application deployment. The Deployment Plan Generator can then automatically generate an appropriate deployment plan based on the user’s selections and the service artifact metadata captured in the Service Construction lifecycle phase (see, e.g., diagram 2400 of FIG. 24). As described above, the metadata captured for a given service can include deployment information about the service, as well as deployment information about all of the components that the service may use (e.g., queues, database adapters, etc.). Accordingly, the deployment plan can be automatically generated based on this metadata without any intervention from developers or other individuals.

Figure 25:
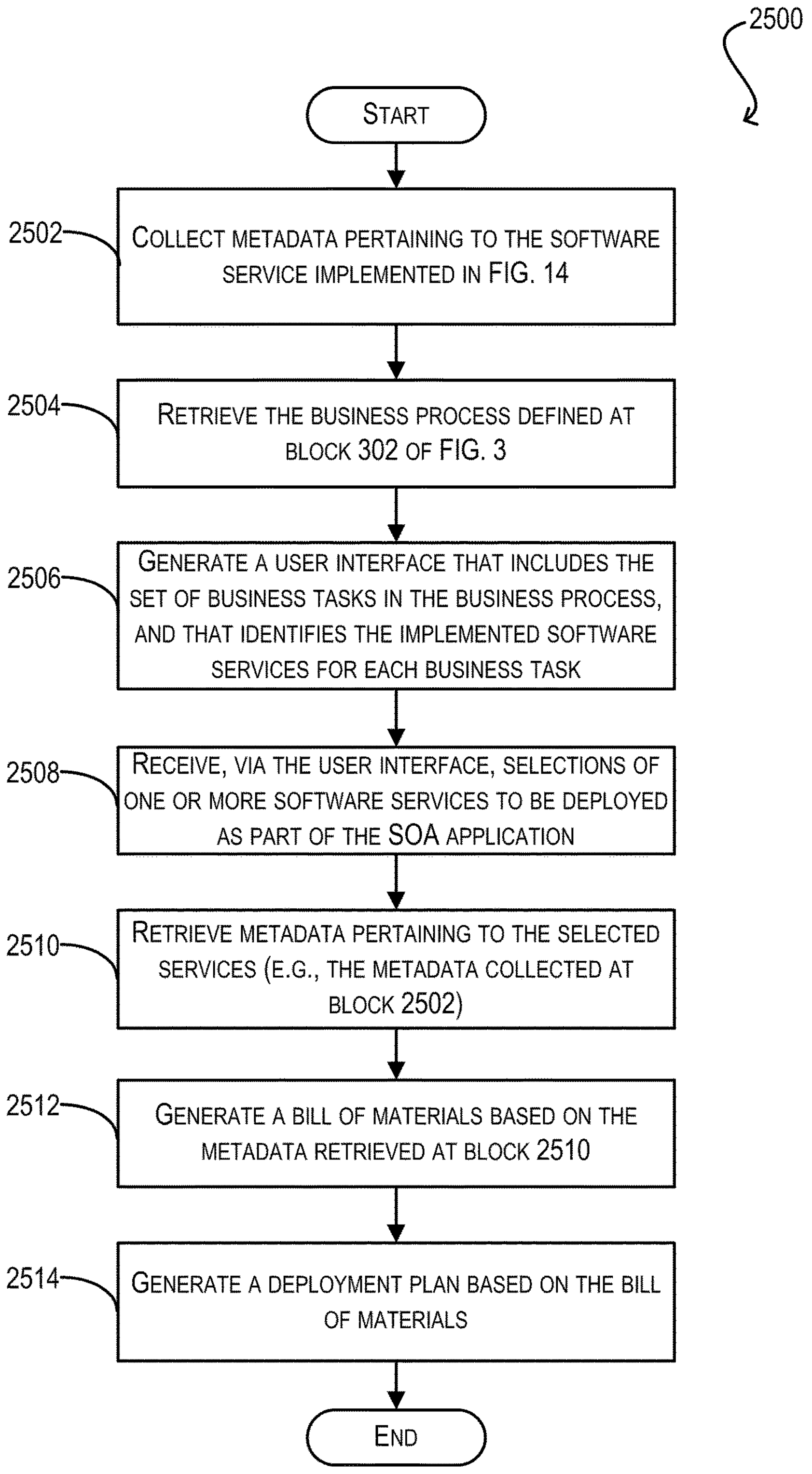
FIG. 25 is a flow diagram illustrating a process for automatically generating a deployment plan in accordance with an embodiment of the present invention.

FIG. 25 illustrates a flow diagram of a process 2500 for automatically generating a deployment plan via PLW and the Deployment Plan Generator according to an embodiment of the present invention. Portions of process 2500 can be implemented in software, hardware, or a combination thereof. As software, process 2500 can be encoded as program code stored on a computer-readable storage medium.

At block 2502, metadata can be collected pertaining to one or more implemented services (e.g., the service implemented in FIG. 14). In one set of embodiments, this collection can be performed during the Service Construction lifecycle phase using the Harvester as described above. In another set of embodiments, this collection can be performed during the Deployment Plan Generation phase.

Figure 26:
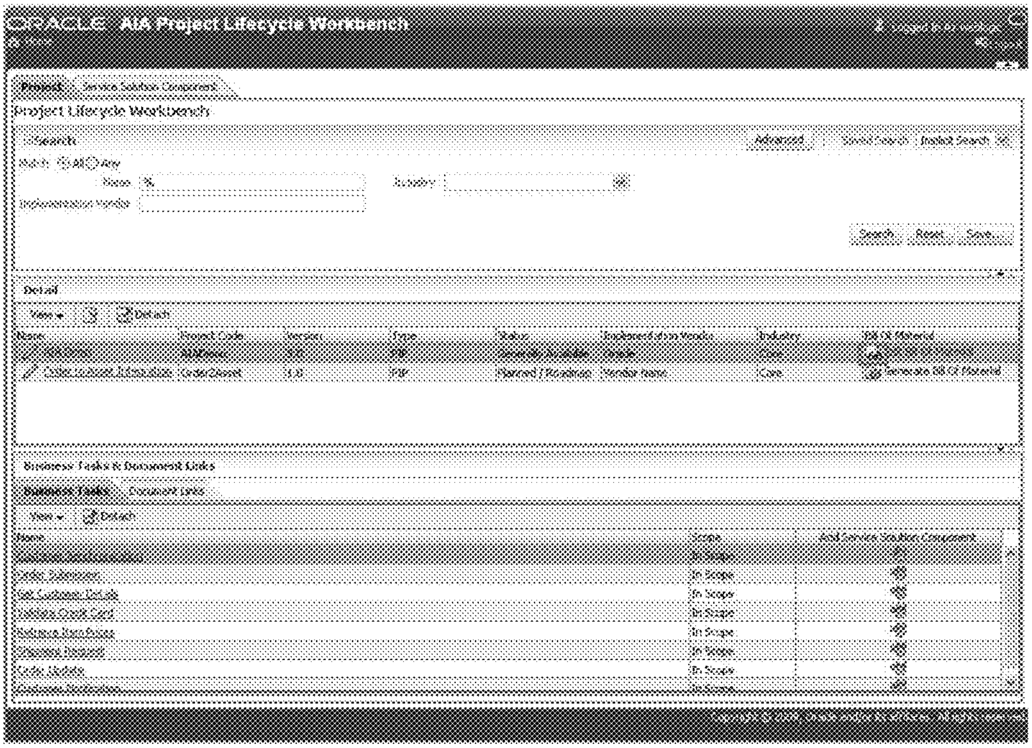
FIGS. 26-28 are screenshots of user interfaces for carrying out the process of FIG. 25 in accordance with an embodiment of the present invention.

At block 2504, PLW can retrieve a definition of a business process/SOA application (e.g., the business process defined at block 302 of FIG. 3) from the PLW backend for the purpose of generating a deployment plan for the application. For example, an installation developer can log into PLW and access a list of previously entered business processes. From this list, the installation developer can select a particular application by activating, e.g., a "Generate Bill-of-Material" control (see PLW user interface 2600 of FIG. 26).

Figure 27:
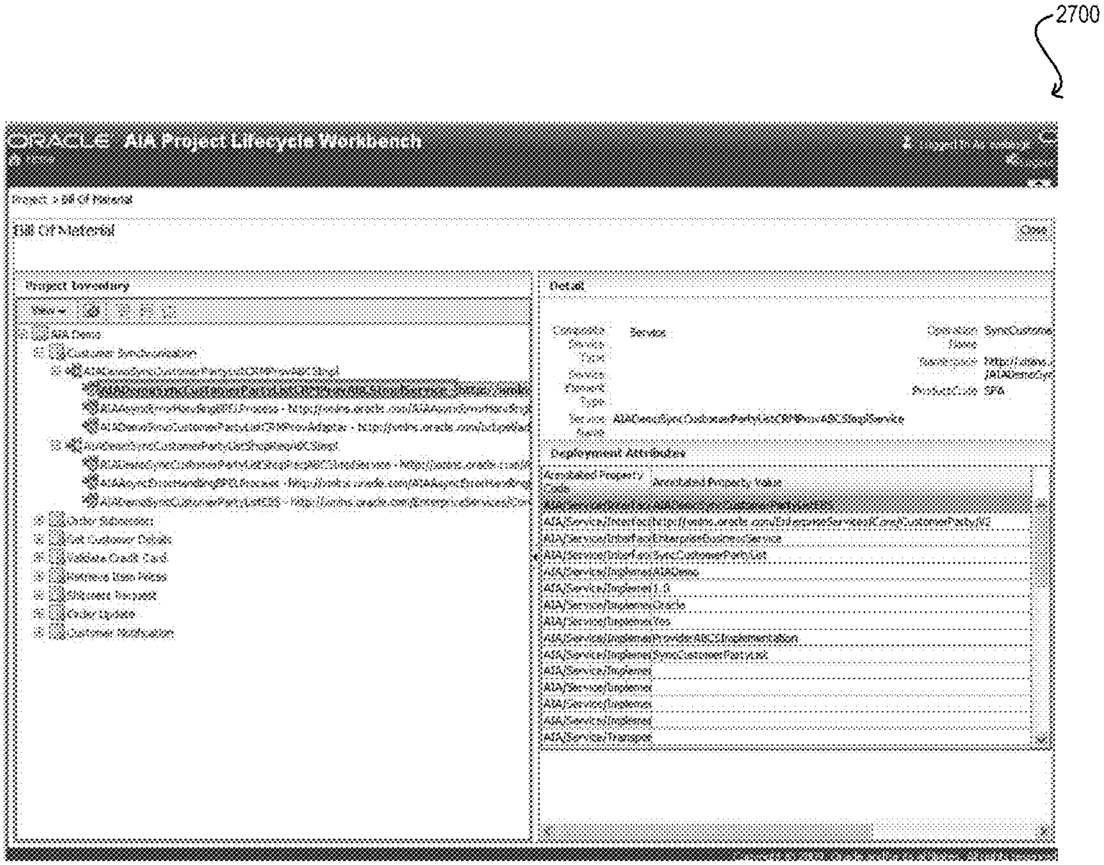

Upon activating the "Generate Bill-of-Material" control, PLW can generate a task/service hierarchy that depicts all of the business tasks defined for the process/application, as well as the services implemented for each business task (block 2506 of FIG. 25). FIG. 27 illustrates an example PLW user interface 2700 that includes such a hierarchy. In one set of embodiments, the generation of user interface 2700 can be based on the business process/service solution component definitions captured during the Functional Definition lifecycle phase and the artifact metadata collected at block 2502.

From user interface 2700, the installation developer can add or remove business tasks and add or remove services. In addition, the installation developer can view the metadata (e.g., deployment information) for each service.

Figure 28:
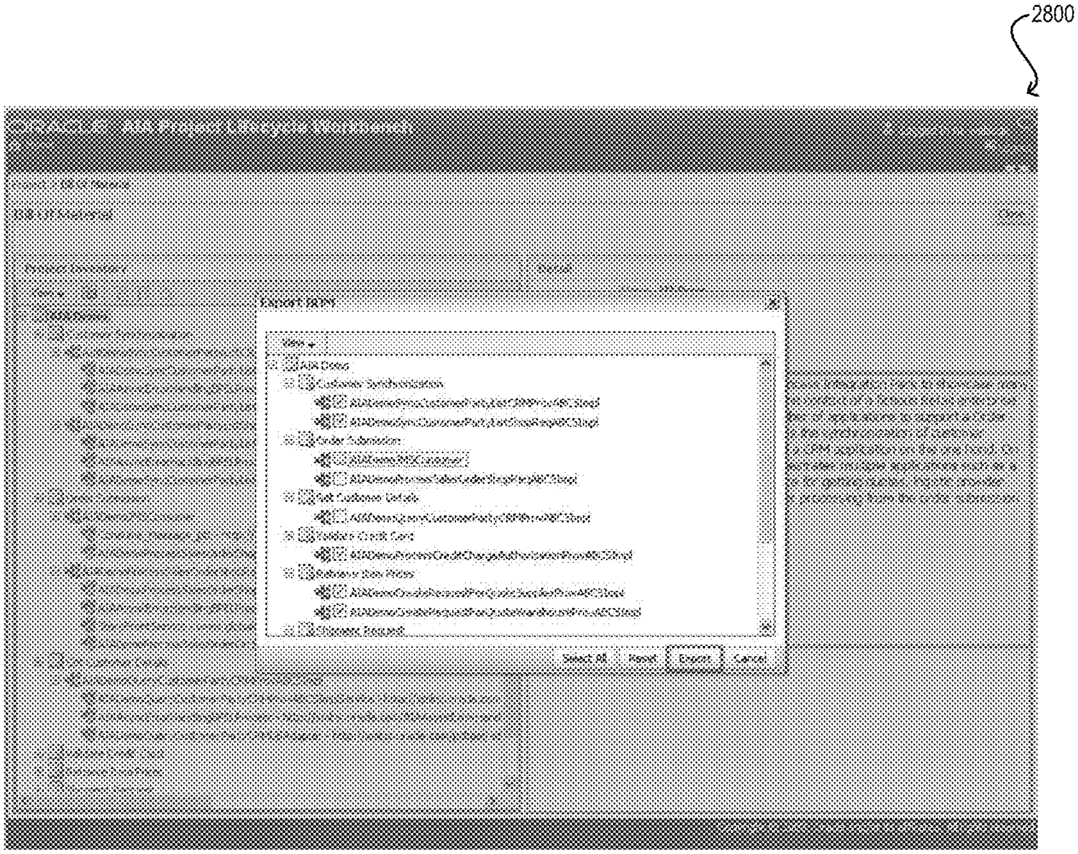

Once the installation developer has modified the structure of the application as needed via user interface 2700, the installation developer can activate an "Export BOM" control. Activating this control can cause a dialog window to be rendered that depicts the task/service hierarchy of user interface 2700 with a checkbox next to each service (see user interface 2800 of FIG. 28). From user interface 2800, the installation developer can select or de-select particular services to be included in the deployment. Based on the developer's selections, the Deployment Plan Generator can create an intermediate file known as a "bill of materials" (block 2512). Based on the bill of materials, the Deployment Plan Generator can automatically generate a final deployment plan for the application (block 2514).

In various embodiments, the deployment plan can specify all of the objects and configurations that are needed for deployment of the application, including not only services, but also queues, adapters, DB objects, and the like. An example deployment plan is described with respect to FIG. 30 below. In order to automatically generate this plan, the Deployment Plan Generator relies on both the functional definitions entered by the solution architects during the Functional Definition lifecycle phase and the artifact metadata (including deployment information) harvested during the Development lifecycle phase.

Once the deployment plan has been created, the service artifacts and related data can be packaged and shipped to customers for installation. In one set of embodiments, all of the seed data used to generate the deployment plan (e.g., data in the PLW backend, the bill of materials, etc.), as well as the PLW application, related tools, and the deployment plan itself, can be provided to customers. Accordingly, customers can leverage the functionality described herein to add new services and create custom deployment plans to customize the application to their specific needs.

It should be appreciated that process 2500 is illustrative and that variations and modifications are possible. Steps described as sequential may be executed in parallel, order of steps may be varied, and steps may be modified, combined, added, or omitted. For example, in one set of embodiments, the Deployment Plan Generator can directly create a deployment plan from the selections and metadata received at blocks 2508 and 2510 (rather than creating an intermediary bill of materials). One of ordinary skill in the art would recognize other variations, modifications, and alternatives.

Installation Driver

Figure 29:
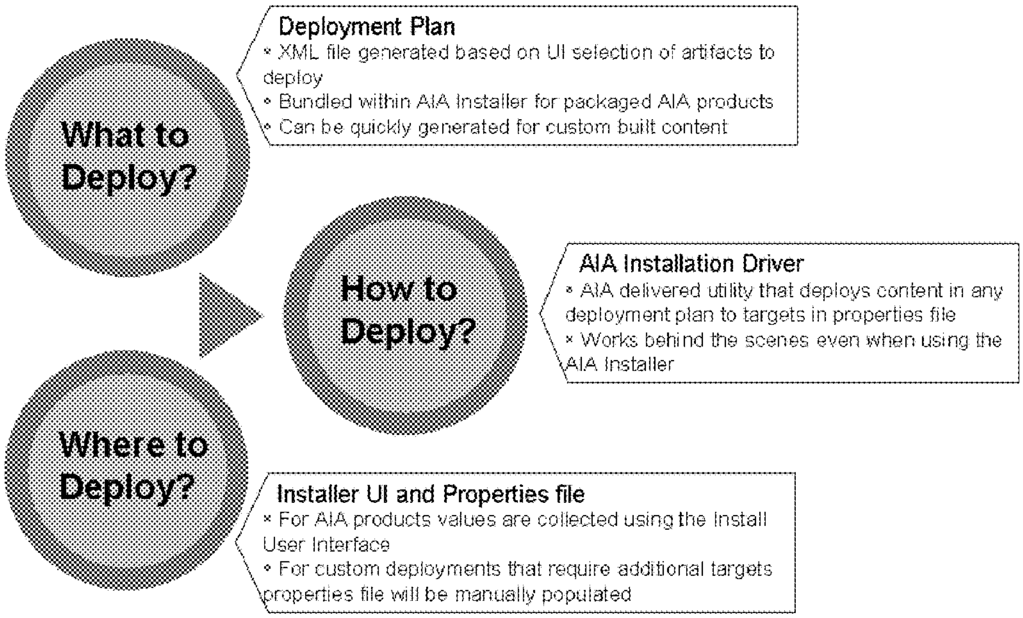
FIG. 29 is a simplified block diagram illustrating inputs to the installation driver in accordance with an embodiment of the present invention.

As discussed with respect to FIG. 1, in the Deploy lifecycle phase, customer IT deploys a packaged SOA application at a customer site. In one set of embodiments, AIA can include a tool known as the Installation Driver that facilitates this deployment process. In particular, the Installation Driver can retrieve the deployment plan created during the Deployment Plan Generation lifecycle phase (which defines "what to deploy") and can interpret the deployment plan against a deployment properties file (which defines "where to deploy"). Based on the deployment plan and deployment properties file, the Installation Driver can automatically deploy the application content to appropriate target locations at the customer site (see FIG. 29). By separating out deployment content information (i.e., the deployment plan) from deployment location information (i.e., the deployment properties file), the same deployment plan can be quickly and easily applied to different target locations and topologies. For example, the same deployment plan can be rapidly deployed against a variety of topology variations at both application server and database levels.

Figure 30:
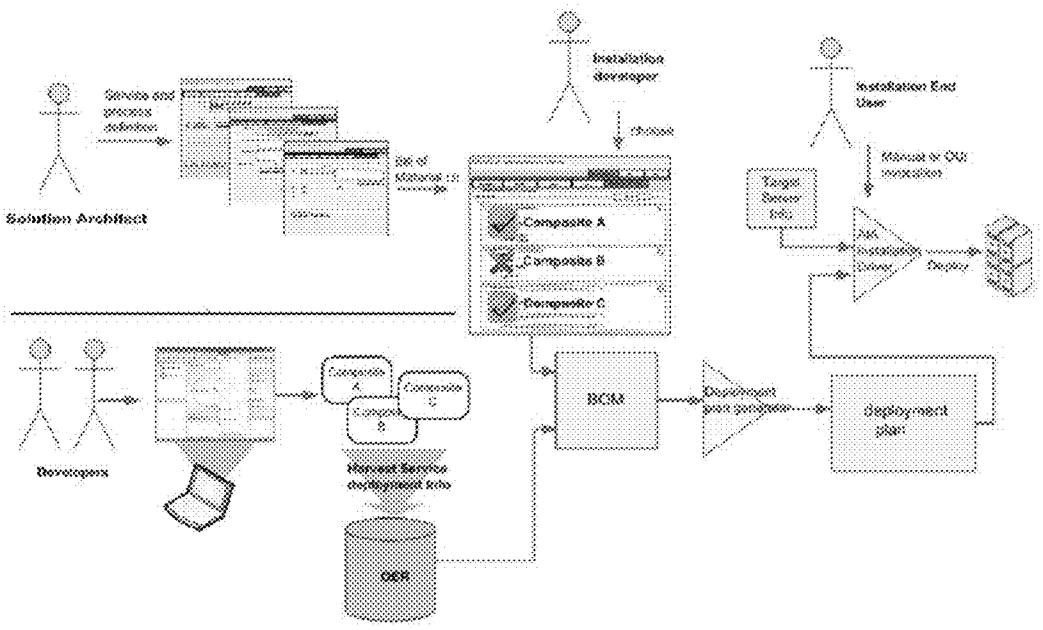
FIG. 30 is a simplified block diagram illustrating an overall SOA development lifecycle as facilitated by AIA in accordance with an embodiment of the present invention.

FIG. 30 is a simplified block diagram illustrating an overall SOA development lifecycle (from the functional definition phase to the deployment phase) as facilitated by AIA. This figure depicts the different actors at each lifecycle stage and how the deployment process is tied to the preceding phases (i.e., functional definition, service construction, deployment plan generation) in the lifecycle.

In various embodiments, the Installation Driver not only deploys services, but can also handle the deployment of queues, xRefs, DVMs, adapters, DB objects, and the like. In addition, the Installation Driver can handle errors during deployment and can include intelligence to automatically deploy to different physical topologies, such as remote servers, clusters, etc. The database schemas can also be configured instantly in any manner as determined by a user. Upon completion of deployment, customers can immediately use the application.

As described above, in some embodiments the packaged SOA application can include the PLW application, related AIA tools, and seed data. Accordingly, customers can install and use the pre-built application contents in the deployed package, or introduce their own, homegrown services, cherry-pick from among the pre-built AIA-shipped services, and generate their own, custom deployment plans. The Installation Driver can interpret these custom deployment plans and install the required integration accordingly.

Figure 31:
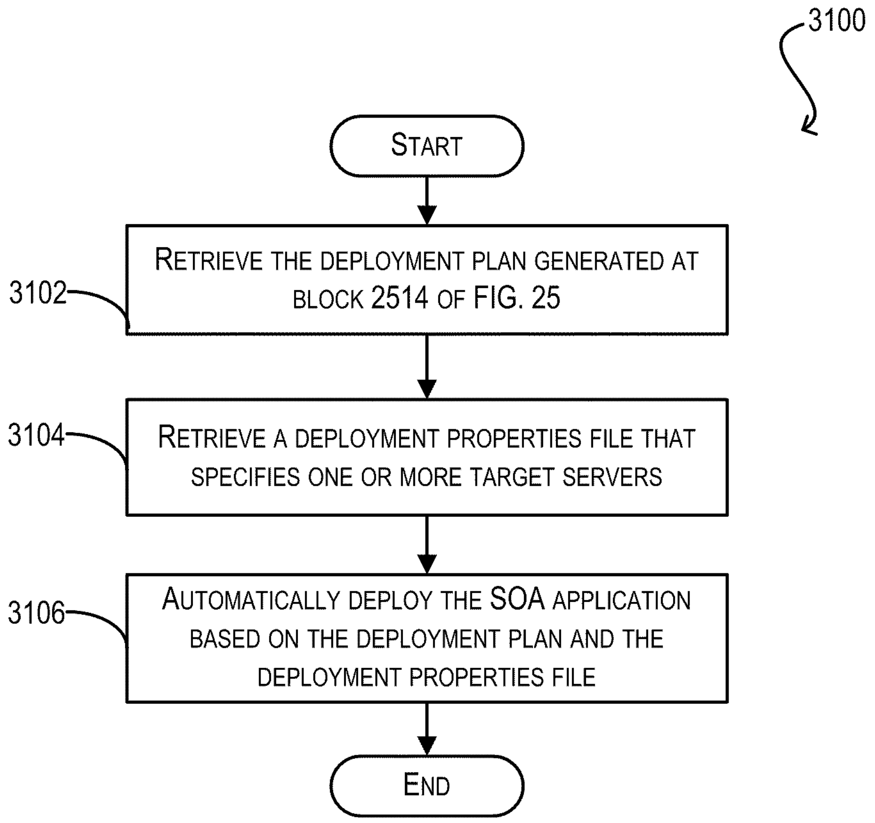
FIG. 31 is a flow diagram illustrating a process for deploying an SOA application in accordance with an embodiment of the present invention.

FIG. 31 is a flow diagram of a process 3100 for installing and deploying an SOA application via the Installation Driver according to an embodiment of the present invention. Portions of process 3100 can be implemented in software, hardware, or a combination thereof. As software, process 3100 can be encoded as program code stored on a computer-readable storage medium.

Figure 32:
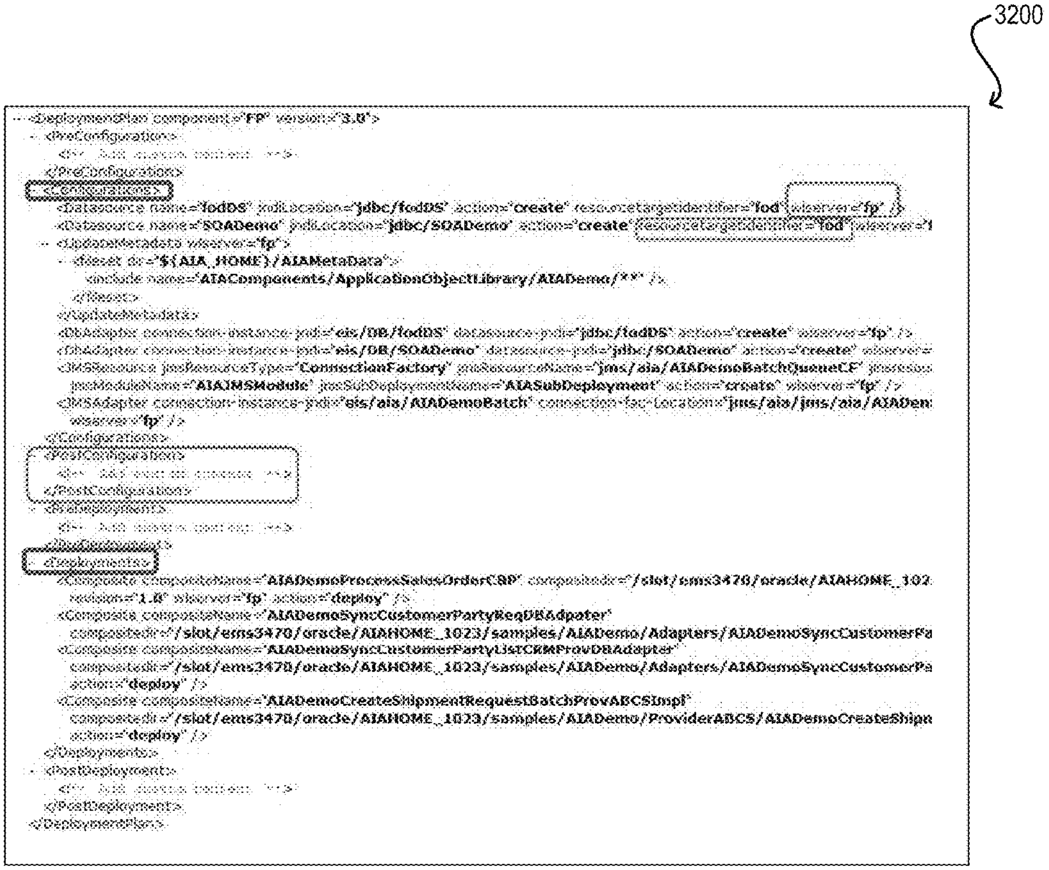
FIG. 32 illustrates an example deployment plan in accordance with an embodiment of the present invention.

At block 3102, the Installation Driver can retrieve a deployment plan generated during the Deployment Plan Generation lifecycle phase (e.g., block 2514 of FIG. 25). FIG. 32 illustrates an example deployment plan 3200 according to an embodiment of the present invention. As shown, deployment plan 3200 can be expressed in Extensible Markup Language (XML). The content defined under the "Deployments" XML tag can define those services that were selected to be deployed. The content defined under the "Configurations" XML tag can define various configurations that are required for the services to operate successfully. Note that the services were selected using the PLW UI but the configuration information was enriched based on the harvested service metadata. This loose coupling enables rapid deployment.

In one set of embodiments, deployment plan 3200 can correspond to the unmodified version shipped with the packaged SOA application. In another set of embodiments, deployment plan 3200 can be extended by the customer prior to deployment. For example, customers can add additional tags under "Deployments" and 'Configurations," and can also add post and/or pre deployment actions. These custom tags can be interpreted by the Installation Driver provided that they adhere to the schema defined for the plan.

At block 3104, the Installation Driver can retrieve a deployment properties file that specifies one or more target servers for the deployment. In one set of embodiments, values in the deployment properties file can be entered manually. In alternative embodiments, the deployment properties files can be generated by the Installation Driver based on information entered by a user via one or more user interface screens.

FIG. 33 illustrates an example deployment properties file 3300 according to an embodiment of the present invention. Like deployment plan 3200, deployment properties file 3300 can be expressed in XML. Deployment properties file 3300 can include various tags that correspond to content in deployment plan 3200. For example, in FIG. 32, deployment plan 3200 includes the attribute "wlserver" that is assigned the value "fp." This reference to "fp" corresponds to the details of an application server (e.g., Weblogic server) defined under the "fp" tag in deployment properties file 3300. In this manner, deployment properties file 3300 can provide target location information for any of the objects defined in deployment plan 3200. For example, deployment properties file 3300 can identify target applications servers, target database servers, and the like. In one set of embodiments, additional information (e.g., name/value pairs) can be added to deployment properties file 3300 to define, for example, additional target servers. These names can then be cross referenced in the deployment plan. Since the deployment plan does not include actual server names/addresses, the deployment plan can be deployed any number of times against any number of servers.

Once the deployment plan and deployment properties file are retrieved, the Installation Driver can automatically install and deploy the application to the appropriate target locations (block 3106 of FIG. 31). As noted above, the Installation Driver can handle the details of deploying the specified services and their associated configurations, without any input from the operator. The Installation Driver can also interpret and process custom deployment commands/activities that are added to the deployment plan via custom tags.

It should be appreciated that process 3100 is illustrative and that variations and modifications are possible. For example, steps described as sequential may be executed in parallel, order of steps may be varied, and steps may be modified, combined, added, or omitted. One of ordinary skill in the art would recognize other variations, modifications, and alternatives.

As described above, embodiments of the present invention provide a streamlined development lifecycle experience for building SOA based applications. In particular, the components described herein can allow each lifecycle phase to support downstream activities in an automated manner, thereby enforcing SOA best practices, enhancing development productivity, and ensuring the quality of the final SOA deliverables.

Figure 34:
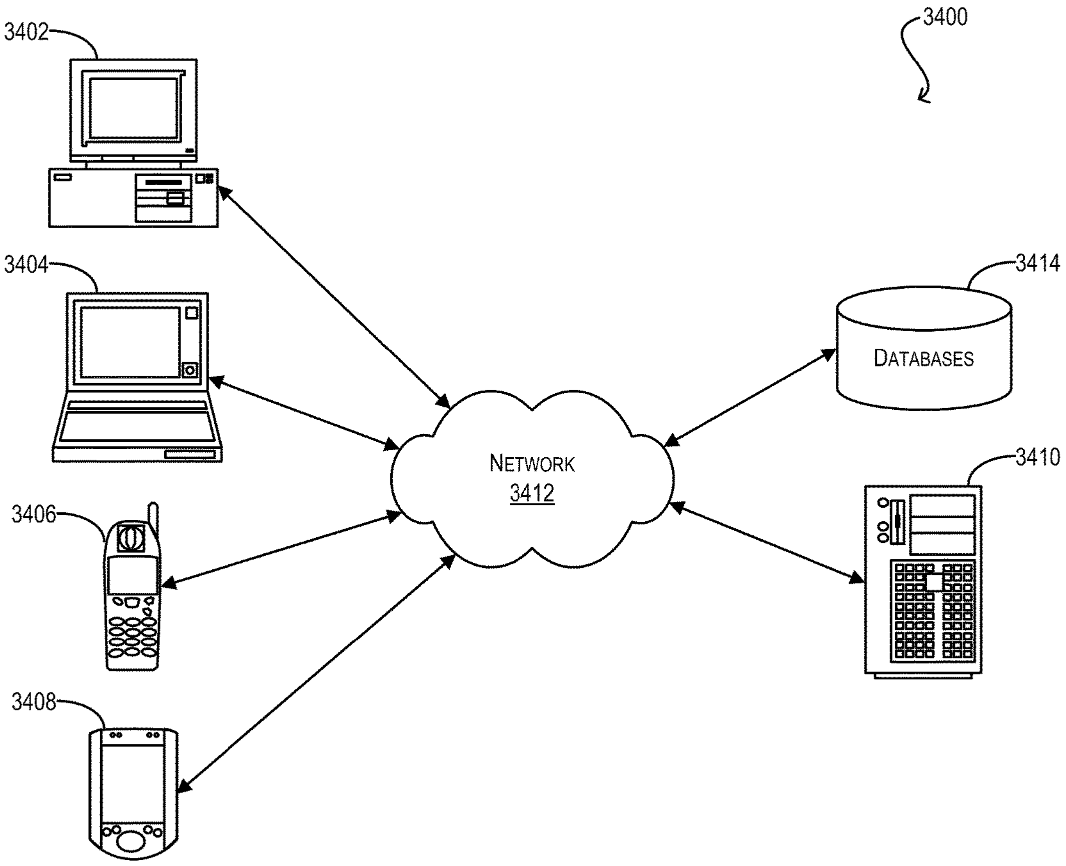
FIG. 34 is a simplified block diagram illustrating a system environment that can be used in accordance with an embodiment of the present invention.

FIG. 34 is a simplified block diagram illustrating a system environment 3400 that can be used in accordance with an embodiment of the present invention. As shown, system environment 3400 can include one or more client computing devices 3402, 3404, 3406, 3408, which can be configured to operate a client application such as web browser, proprietary client (e.g., Oracle Forms), and/or the like. In various embodiments, client computing devices 3402, 3404, 3406, 3408 can be used to execute the client-side code for one or more of the application and tools described above (e.g., PLW, Service Constructor, etc.).

Client computing devices 3402, 3404, 3406, 3408 can be general purpose personal computers (e.g., personal computers and/or laptop computers running various versions of Microsoft Windows and/or Apple Macintosh operating systems), cell phones or PDAs (running software such as Microsoft Windows Mobile and being Internet, e-mail, SMS, Blackberry, or other communication protocol enabled), and/or workstation computers running any of a variety of commercially-available UNIX or UNIX-like operating systems (including without limitation the variety of GNU/Linux operating systems). Alternatively, client computing devices 3402, 3404, 3406, 3408 can be any other electronic device capable of communicating over a network, such as network 3412 described below). Although system environment 3400 is shown with four client computing devices, it should be appreciated that any number of client computing devices can be supported.

System environment 3400 can further include a network 3412. Network 3412 can be any type of network familiar to those skilled in the art that can support data communications using a network protocol, such as TCP/IP, SNA, IPX, AppleTalk, and the like. Merely by way of example, network 3412 can be a local area network (LAN), such as an Ethernet network, a Token-Ring network and/or the like; a wide-area network; a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, the Bluetooth protocol known in the art, and/or any other wireless protocol); and/or any combination of these and/or other networks.

System environment 3400 can further include one or more server computers 3410 which can be general purpose computers, specialized server computers (including, e.g., PC servers, UNIX servers, mid-range servers, mainframe computers rack-mounted servers, etc.), server farms, server clusters, or any other appropriate arrangement and/or combination. In various embodiments, server 3410 can be adapted to run server-side code for one or more of the applications or tools described above (e.g., PLW, Deployment Plan Generator, etc.).

Server 3410 can run an operating system including any of those discussed above, as well as any commercially available server operating system. Server 3410 can also run any of a variety of additional server applications and/or mid-tier applications, including web servers, FTP servers, CGI servers, Java servers, database servers, and the like. Exemplary database servers can include, e.g., those commercially available from Oracle, Microsoft, Sybase, and IBM.

System environment 3400 can further include one or more databases 3414. Databases 3414 can be used to store any of the data described in the foregoing disclosure. In certain embodiments, databases 3414 can include databases that are used by the PLW backend to store functional definitions, service artifact metadata, and the like. Databases 3414 can reside in a variety of locations. By way of example, one or more of databases 3414 can reside on a storage medium local to (and/or resident in) one or more of the computers 3402, 3404, 3406, 3408, and 3410. Alternatively, databases 3414 can be remote from any or all of the computers 3402, 3404, 3406, 3408, and 3410, and/or in communication (e.g., via network 3412) with one or more of these. In one set of embodiments, databases 3414 can reside in a storage-area network (SAN) familiar to those skilled in the art. In further embodiments, databases 3414 can include relational databases, such as Oracle 11g, that are adapted to store, update, and retrieve data in response to SQL-formatted commands.

Figure 35:
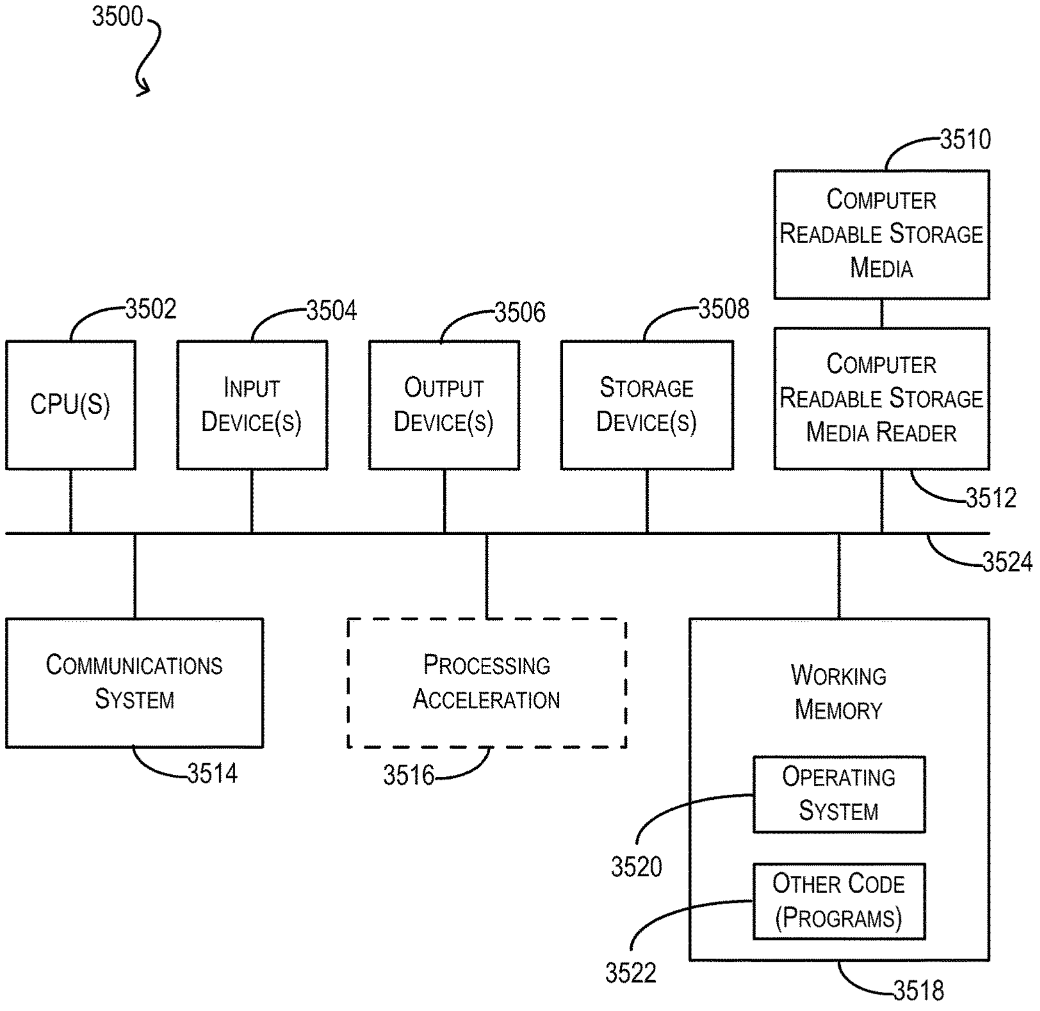
FIG. 35 is a simplified block diagram illustrating a computer system that can be used in accordance with an embodiment of the present invention.

FIG. 35 is a simplified block diagram illustrating a computer system 3500 that can be used in accordance with an embodiment of the present invention. In various embodiments, computer system 3500 may be used to implement any of the computers 3402, 3404, 3406, 3408, and 3410 described with respect to system environment 3400 above. As shown, computer system 3500 can include hardware elements that are electrically coupled via a bus 3524. The hardware elements can include one or more central processing units (CPUs) 3502, one or more input devices 3504 (e.g., a mouse, a keyboard, etc.), and one or more output devices 3506 (e.g., a display device, a printer, etc.). Computer system 3500 can also include one or more storage devices 3508. By way of example, the storage device(s) 3508 can include devices such as disk drives, optical storage devices, and solid-state storage devices such as a random access memory (RAM) and/or a read-only memory (ROM), which can be programmable, flash-updateable and/or the like.

Computer system 3500 can additionally include a computer-readable storage media reader 3512, a communications subsystem 3514 (e.g., a modem, a network card (wireless or wired), an infra-red communication device, etc.), and working memory 3518, which can include RAM and ROM devices as described above. In some embodiments, computer system 3500 can also include a processing acceleration unit 3516, which can include a digital signal processor (DSP), a special-purpose processor, and/or the like.

Computer-readable storage media reader 3512 can further be connected to a computer-readable storage medium 3510, together (and, optionally, in combination with storage device(s) 3508) comprehensively representing remote, local, fixed, and/or removable storage devices plus storage media for temporarily and/or more permanently containing computer-readable information. Communications system 3514 can permit data to be exchanged with network 3412 and/or any other computer described above with respect to system environment 3400.

Computer system 3500 can also comprise software elements, shown as being currently located within working memory 3518, including an operating system 3520 and/or other code 3522, such as an application program (which may be a client application, Web browser, mid-tier application, RDBMS, etc.). It should be appreciated that alternative embodiments of computer system 3500 can have numerous variations from that described above. For example, customized hardware can be used and particular elements can be implemented in hardware, software, or both. Further, connection to other computing devices such as network input/output devices can be employed.

Storage media and computer readable media for containing code, or portions of code, can include any appropriate media known or used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a computer.

Although specific embodiments of the invention have been described above, various modifications, alterations, alternative constructions, and equivalents are within the scope of the invention. For example, AIA is not restricted to use in a specific SOA environment, and can be used to develop and deploy SOA applications to any SOA infrastructure. Further, although embodiments of the present invention have been described with respect to certain flow diagrams and steps, it should be apparent to those skilled in the art that the scope of the present invention is mot limited to the described flow diagrams and steps.

Yet further, although embodiments of the present invention have been described using a particular combination of hardware and software, it should be recognized that other combinations of hardware and software are also within the scope of the present invention.

The specification and drawings are, accordingly, to be regarded in a illustrative rather than restrictive sense. It will be evident that additions, subtractions, and other modifications may be made thereunto without departing from the broader spirit and scope of the invention as set forth in the following claims.

What is claimed is:

1. A method comprising:

receiving, by a computer system, a definition of a business process including a set of business tasks, the business process being a functional representation of a Service Oriented Architecture application;

receiving, by the computer system, a definition of a service solution component for a business task in the set of business tasks, the service solution component being a functional representation of a software service that fulfills the business task;

storing, by the computer system, the definition of the business process and the definition of the service solution component in a shared data store;

generating, based on the definition of the business process, a user interface identifying the set of business tasks and a set of software services associated with the set of business tasks;

receiving, via the user interface, a selection of a software service in the set of software services;

implementing a harvester, the harvester configured to:

collect service artifact metadata related to the selection of the software, the service artifact metadata comprising an asset graph that identifies relationships between the set of software services; and publish the service artifact metadata to the shared data store;

automatically generating, based on the selection of the software service and the service artifact metadata related to the selected software service, a deployment plan for deploying the Service Oriented Architecture application, the deployment plan comprising:

information that identifies the selected software service;

the service artifact metadata related to the selected software service; and deployment information comprising a location for deploying the selected software service; and deploying the Service Oriented Architecture application to the location in accordance with the deployment information and the deployment plan.

2. The method of claim 1 wherein receiving the definition of the service solution component comprises:

receiving, from a user, a query for searching a repository of existing software services, the query being configured to find an existing software service that fulfills the business task;

executing the query; and if the query execution identifies an existing software service that fulfills the business task, associating the existing software service with the service solution component.

3. The method of claim 1 wherein receiving the definition of the service solution component comprises receiving a description of the desired functionality of the software service.

4. The method of claim 3 wherein receiving the definition of the service solution component further comprises receiving a service type for the software service.

5. The method of claim 4 wherein receiving the definition of the service solution component further comprises receiving a product code for the software service.

6. The method of claim 1 wherein, at a time of implementing the software service, the definition of the service solution component is retrieved from the shared data store and used to generate one or more artifacts of the software service.

7. The method of claim 6 wherein, once implementation of the software service is complete, the service artifact metadata pertaining to the software service is associated with the service solution component and stored in the shared data store.

8. The method of claim 1 wherein the service artifact metadata includes the deployment information for the software service.

9. The method of claim 8 further comprising, at a time of deploying the Service Oriented Architecture application:

retrieving the definition of the business process from the shared data store; and wherein generating the deployment plan includes generating a bill of materials for deploying the Service Oriented Architecture application.

10. The method of claim 9 further comprising generating the deployment plan based on the bill of materials.

11. The method of claim 10 further comprising creating a deployable package for the Service Oriented Architecture application.

12. The method of claim 11 wherein the deployable package includes the deployment plan and one or more artifacts of the software service.

13. The method of claim 12 wherein the deployable package further includes the definition of the business process, the definition of the service solution component, and the metadata pertaining to the software service.

14. The method of claim 1, further comprising enabling, via the user-interface, a de-selection of the software service in the set of software services.

15. The method of claim 14, further comprising generating a modified deployment plan based at least in part on the de-selected software service.

16. The method of claim 1, further comprising providing, via the user interface, the service artifact metadata related to the selected software service, the service artifact metadata comprising information for fulfilling a functionality related to the selected software.

17. The method of claim 1, wherein the service artifact metadata comprises at least one of the deployment information pertaining to the selected software service, relationships between one or more service artifacts pertaining to the selected software service and functional definition information pertaining to the selected software service.

18. A non-transitory computer-readable storage medium having stored thereon program code executable by a computer system, the program code comprising:

code that causes a computer system to receive a definition of a business process including a set of business tasks, the business process being a functional representation of a Service Oriented Architecture application;

code that causes the computer system to receive a definition of a service solution component for a business task in the set of business tasks, the service solution component being a functional representation of a software service that fulfills the business task;

code that causes the computer system to store the definition of the business process and the definition of the service solution component in a shared data store;

code that causes the computer system to generate, based on the definition of the business process, a user interface identifying the set of business tasks and a set of software services associated with the set of business tasks;

code that causes the computer system to receive, via the user interface, a selection of a software service in the set of software services;

code that causes the computer system to implement a harvester, the harvester configured to:

collect service artifact metadata related to the selection of the software, the service artifact metadata comprising an asset graph that identifies relationships between the set of software services; and publish the service artifact metadata to the shared data store;

code that causes the computer system to automatically generate, based on the selection of the software service and the service artifact metadata related to the selected software service, a deployment plan for deploying the Service Oriented Architecture application, the deployment plan comprising:

information that identifies the selected software service;

the service artifact metadata related to the selected software service; and deployment information comprising a location for deploying the selected software service; and code that causes the computer system to deploy the Service Oriented Architecture application to the location in accordance with the deployment information and the deployment plan.

19. The non-transitory computer-readable storage medium of claim 18 wherein the code that causes the computer system to receive the definition of the service solution component comprises:

code that causes the computer system to receive, from a user, a query for searching a repository of existing software services, the query being configured to find an existing software service that fulfills the business task;

code that causes the computer system to execute the query; and if the query execution identifies an existing software service that fulfills the business task, code that causes the computer system to associate the existing software service with the service solution component.

20. The non-transitory computer-readable storage medium of claim 18 further comprising:

code that causes the computer system to retrieve the definition of the business process from the shared data store; and wherein the code that causes the computer system to generate the deployment plan includes code that causes the computer system to generate a bill of materials for deploying the Service Oriented Architecture application.

21. A system comprising:

a memory storing a plurality of instructions; and a processor configured to access the memory, wherein the processor is further configured to execute the plurality of instructions to at least:

receive a definition of a business process including a set of business tasks, the business process being a functional representation of a Service Oriented Architecture application;

receive a definition of a service solution component for a business task in the set of business tasks, the service solution component being a functional representation of a software service that fulfills the business task;

store the definition of the business process and the definition of the service solution component in a shared data store;

generate, based on the definition of the business process, a user interface identifying the set of business tasks and a set of software services associated with the set of business tasks;

receive, via the user interface, a selection of a software service in the set of software services;

implement a harvester, the harvester configured to:

collect service artifact metadata related to the selection of the software, the service artifact metadata comprising an asset graph that identifies relationships between the set of software services; and publish the service artifact metadata to the shared data store;

automatically generate, based on the selection of the software service and the service artifact metadata related to the selected software service, a deployment plan for deploying the Service Oriented Architecture application, the deployment plan comprising:

information that identifies the selected software service;

the service artifact metadata related to the selected software service; and deployment information comprising a location for deploying the selected software service; and deploy the Service Oriented Architecture application to the location in accordance with the deployment information and the deployment plan.

22. The system of claim 21, wherein the processor is further configured to execute the plurality of instructions to at least generate the deployment plan based on generating a bill of materials for deploying the Service Oriented Architecture application.

* * * * *

UNITED STATES PATENT AND TRADEMARK OFFICE

CERTIFICATE OF CORRECTION

PATENT NO. : 9,886,253 B2
APPLICATION NO. : 12/768990
DATED : February 6, 2018
INVENTOR(S) : Annaji Garimella et al.

It is certified that error appears in the above-identified patent and that said Letters Patent is hereby corrected as shown below:

On the Title Page

Item (56) References Cited, Other Publications:

At page 2, Column 2, Line 60, delete "filed" and insert -- filed on --, therefor.

In the Drawings

At Sheet 10 of 34, Reference Numeral 1102, in Fig. 11, delete "FOR FOR" and insert -- FOR --, therefor.

In the Specification

In Column 1, Line 20, delete "23," and insert -- 28, --, therefor.

In Column 13, Line 21, delete "'Configurations,'" and insert -- "Configurations," --, therefor.

In Column 16, Line 30, delete "mot" and insert -- not --, therefor.

Signed and Sealed this
Eighteenth Day of June, 2019

Andrei Iancu
*Director of the United States Patent and Trademark Office*